(12) United States Patent
Shoji

(10) Patent No.: US 6,230,379 B1
(45) Date of Patent: May 15, 2001

(54) COMBINED MACHINING APPARATUS FOR MAKING PISTON RINGS

(75) Inventor: Masahiro Shoji, Ishikawa (JP)

(73) Assignee: Komatsu Machinery Corp., Komatsu (JP)

( * ) Notice: Subject to any disclaimer, the term of this patent is extended or adjusted under 35 U.S.C. 154(b) by 0 days.

(21) Appl. No.: 09/380,681

(22) PCT Filed: Mar. 4, 1998

(86) PCT No.: PCT/JP98/00897

§ 371 Date: Nov. 29, 1999

§ 102(e) Date: Nov. 29, 1999

(87) PCT Pub. No.: WO98/39139

PCT Pub. Date: Sep. 11, 1998

(30) Foreign Application Priority Data

Mar. 4, 1997 (JP) .................................................. 9-048823
Jun. 19, 1997 (JP) .................................................. 9-162504

(51) Int. Cl.[7] .................................................. B23P 15/08
(52) U.S. Cl. ...................................... 29/27 C; 29/888.076
(58) Field of Search ................... 29/27 C, 27 R, 29/888.075, 888.076; 82/122

(56) References Cited

U.S. PATENT DOCUMENTS

| | | | | |
|---|---|---|---|---|
| 1,946,881 | * | 2/1934 | Porter .............................. | 29/888.076 |
| 2,098,790 | * | 11/1937 | Newton ........................... | 29/888.076 |
| 2,377,960 | * | 6/1945 | Phillips ............................ | 29/27 R |
| 2,932,227 | * | 4/1960 | Koch et al. ...................... | 82/19 |
| 3,938,235 | * | 2/1976 | Wendt, III et al. ............... | 29/412 |
| 4,250,779 | * | 2/1981 | Feller et al. ..................... | 82/18 |
| 4,314,492 | * | 2/1982 | Feller et al. ..................... | 82/18 |
| 4,400,859 | * | 8/1983 | Woythal et al. .................. | 29/27 C |
| 4,856,105 | * | 8/1989 | Brocksieper et al. ............ | 29/888.076 |
| 5,025,690 | * | 6/1991 | Myers .............................. | 82/122 |
| 5,081,889 | * | 1/1992 | Takano et al. ................... | 82/122 |
| 6,062,117 | * | 5/2000 | Shoji ................................ | 82/122 |
| 6,134,763 | * | 10/2000 | Shoji ................................ | 29/27 R |

FOREIGN PATENT DOCUMENTS

| | | | | |
|---|---|---|---|---|
| 485252 | * | 7/1952 | (CA) ............................... | 29/888.076 |
| 3316257 | * | 8/1984 | (DE) ............................... | 29/888.075 |
| 789010 | * | 1/1958 | (GB) ............................... | 29/888.076 |
| 54-21691 | | 2/1979 | (JP) . | |
| 63-99136 | | 4/1988 | (JP) . | |
| 2-224903 | * | 9/1990 | (JP) ................................ | 29/27 C |
| 6-75814 | | 9/1994 | (JP) . | |
| 8-25159 | | 1/1996 | (JP) . | |
| 308848 | * | 7/1971 | (SU) ............................... | 29/888.076 |

* cited by examiner

Primary Examiner—A. L. Wellington
Assistant Examiner—Erica Ergenbright
(74) Attorney, Agent, or Firm—Armstrong, Westerman, Hattori, McAleland & Naughton, LLP

(57) ABSTRACT

A combined apparatus for making piston rings is disclosed which is provided with an interior-exterior working machine (1) operable under synchronous control by an NC unit (36) for machining both inside and outside of a workpiece (16) composed of a stack of piston ring workpieces brought and held together; a severing machine (41) for severing the workpiece (16) longitudinally thereof; and a common bed (1a), wherein the interior-exterior working machine (1) as a first machine body and said severing machine (41) as a second machine body are mounted adjacent to each other on the common bed (1a).

8 Claims, 30 Drawing Sheets

COMBINED MACHINING APPARATUS FOR MAKING PISTON RINGS

TECHNICAL FIELD

The present invention relates to a combined machining apparatus for making piston rings that can perform both the peripheral (inner and outer) machining and severing of piston ring workpieces to prepare the piston rings.

BACKGROUND ART

Piston rings as used in engines have hitherto been made by preparing a stack of workpieces in the form of noncircular rings brought together (a piston ring workpiece aggregate or briefly a piston ring aggregate). The piston ring aggregate (in the form of a non-circular cylinder) is machined over its inner and outer peripheral surfaces to impart thereto a given shape. The machined piston ring aggregate is then severed by forming two longitudinal cuts parallel to the axial direction in the cylindrical aggregate. The severed aggregate with a portion removed may have its outer peripheral surface become circular in cross section when its diameter is reduced with the two longitudinal cuts joined together. Certain apparatus for machining the inner and outer peripheral surfaces of a piston ring aggregate or a stack of workpieces in the form of non-circular rings brought together are described in, e. g., patent literature JP, P S54-21691A and JP, P H6-75814B.

The machining apparatus described in JP, P S54-21691 A is designed to produce a stack of piston rings and is described as characterized by including a workpiece support shaft adapted to carry workpieces constituting a piston ring aggregate comprising a plurality of piston ring workpieces brought and held together, a tool support means radially displaceable in accordance with non-circularities of machinable surfaces of the piston rings, and at least two electromechanical stepping feed means that are computer controllable to displace the tool support means radially as desired. In the apparatus so constructed, rotating the workpiece support shaft with the workpieces or piston ring aggregate carried thereon while driving the stepping feed means under computer control is described to provide machining of the workpieces with their inner and outer peripheral surfaces defined by free curves machined simultaneously with precision as sought.

A numerically controlled lathe disclosed in JP, P H6-75814 B includes a cutter mounting on a carriage that is movable by a linear motor towards and away from a workpiece such as to yield a piston ring with a skirt portion, the linear motor being adapted to be driven under numerical control by a computer to have an outer peripheral surface of the skirt portion formed by lathing the workpiece. The lathe has on a guide section for supporting the carriage that reciprocates, a plurality of sets of juxtaposed rotary members and a biasing means that supports one of the sets of rotary members to prevent the carriage from laterally moving so that a reaction force that the workpiece being lathed exerts on the cutting tool may be accepted by both the rotary members and the biasing means. This provision is described to permit the carriage to reciprocate without jolting or shaking, which in turn provides, among others, permitting workpieces to be cut with precision.

The machining apparatus described in JP, P S54-21691 A, however, necessarily entails the piston ring aggregate machined over its inner and outer peripheral surfaces to be subsequently severed by using a separate severing apparatus and is inconvenient as it requires more than one machine, thus rendering the equipment costly and necessitating a wide space for their installation.

The machining apparatus described in JP, P S54-21691 A, especially in connection with FIG. 5, further requires that the tool support means having a cutting tool for machining the outside of a workpiece be mounted on a sliding head of which a movement is controlled by a pair of step feed means that are arranged side by side lengthwise of it. The sliding head has on it a second sliding head that is capable of movement by the step feed means in the same direction as that in which the first sliding head is movable. And, a tool support means having a cutting tool for machining the inside of the workpiece is required to be mounted on the second sliding head. The apparatus so constructed has, of necessity, drive systems interlaced and complicated and, also complicating control units therefor, inconveniently renders the entire equipment costly.

The NC lathe described in JP, P H6-75814 B tailored to machine outer peripheral surfaces is not adapted to simultaneously machine both inside and outside of a workpiece and thus is unsatisfactory in productivity. The requirement for the inside and outside of a workpiece to be separately shaped adversely affects their machined concentricity and here again leaves much to be desired in achievable machining accuracy.

Also, a piston ring aggregate machined over its inner and outer peripheral surfaces must, here too, be subsequently severed by using a separate severing apparatus and inconveniently requiring more than one machines renders the equipment costly and necessitates a wide space for their installation.

It is accordingly an object of the present invention to eliminate these disadvantages met in the prior art and to provide a combined machining apparatus that can perform both the peripheral (inner and outer) machining and severing of piston ring workpieces to prepare the piston rings, the apparatus having an increased productivity and requiring less equipment cost and less space for its installation.

SUMMARY OF THE INVENTION

In order to achieve the above mentioned object, the present invention provides in a first aspect thereof a combined apparatus for making piston rings, which comprises: an interior and exterior working machine operable under synchronous control by an NC unit for machining both inside and outside of a workpiece constituted of a stack of piston ring workpieces brought and held together; a severing machine for severing the workpiece longitudinally thereof; and a common bed, wherein the said interior and exterior working machine as a first machine body and the said severing machine as a second machine body are mounted adjacent to each other on the said common bed.

The construction described above permits a piston ring workpiece to be consecutively worked on so as both to be machined or shaped over its inside and outside and to be severed in a single unit of equipment. Hence it eliminates the need for more than one machine to be separately equipped and installed, thus reducing the cost and space for equipment. It also becomes unnecessary to store and maintain semi-finished products, or shaped and yet unsevered workpieces; hence a saving of labor, cost and space for maintenance as well.

In the construction described above, it is preferred that the severing machine be adapted to sever a workpiece by means of a single cutting tool a plurality of times or in more than one steps.

This preferred construction permits a workpiece to be shaped (inside and outside machined) and severed in a substantially equal period of time. Permitting the two separate machining operations to be performed simultaneously and yet in a substantially equal period of time with the severing machine continuing to operate while its counterpart is operating provides an improved machining line balance and results in an enhanced operating efficiency of the entire apparatus, and hence its raised productivity.

In the construction described above, it is preferred that there be mounted between the said first and second machine bodies a workpiece transfer means for transferring the workpiece that has its inside and outside machined to the said severing machine.

This preferred construction which allows a workpiece having its inner and outer surfaces shaped to be transferred to the severing machine permits the two machining operations to be done consecutively without an operator's intervention.

In any of the constructions described above, it is preferred that the said interior and exterior working machine comprises: a workpiece support means for clamping the workpiece oriented substantially vertically, from its opposite upper and lower sides to support it rotatably about its axis extending substantially vertically; a C-axis drive means for acting on the said workpiece support means to rotate the said workpiece about the said axis; an exterior machining means having a first cutting tool arranged to be movable in a direction of an X-axis orthogonal to the said workpiece axis for shaping an outer surface of the said workpiece; an interior machining means having a second cutting tool arranged to be movable in a direction of a U-axis parallel to the said X-axis and adapted to be inserted into the inside of the said workpiece from an end side thereof for shaping an inner surface of the said workpiece; and a Z-axis drive means for acting on the said workpiece support means to move the said workpiece in a direction of the said workpiece axis.

In this specific construction, chips produced inside of a workpiece are allowed to freely fall by gravity downwards and thus prevented from staying within the workpiece. Thus, the chips can no longer reduce machining accuracy and, with the need eliminated to provide a separate means to discharge them, does simplify the construction of the equipment.

This specific construction also provides clamping and retaining from its upper and lower sides a workpiece comprising a stack of piston ring workpieces held together. Thus, in contrast to a case in which such workpieces are clamped laterally, this arrangement advantageously reduces the size of the apparatus that must carry means to compress the workpieces and, also simplifies the structure, and makes the apparatus less costly to produce.

Alternatively, the said interior and exterior working machine comprises: a workpiece support means for clamping the workpiece oriented substantially horizontally, from its opposite left hand and right hand sides to support it rotatably about its axis extending substantially, in a horizontal direction; a C-axis drive means for acting on the said workpiece support means to rotate the workpiece about the said axis; an exterior machining means having a first cutting tool arranged to be movable in a direction of an X-axis orthogonal to the said workpiece axis for shaping an outer surface of said workpiece; and an interior machining means having a second cutting tool arranged to be movable in a direction of a U-axis parallel to the said X-axis and adapted to be inserted into the inside of the said workpiece from an end side thereof for shaping an inner surface of the said workpiece; and a Z-axis drive means for acting on the said workpiece support means to move the said workpiece in a direction of the said workpiece axis.

This alternative construction that allows supporting a workpiece to be inside and outside machined with its center axis extending substantially horizontally can lower the center of gravity of the apparatus and its height. This feature, increasing the column rigidity, provides a better machining accuracy, and also eases including a workpiece transfer means in the apparatus.

In any of the constructions mentioned above, it is preferred that the severing machine comprises: an upper and a lower workpiece support means for clamping the workpiece from its opposite upper and lower sides with a workpiece severing center deviated in position from a B-axis parallel to the axis of the workpiece; a B-axis indexing means for rotating the said workpiece about the said B-axis, and thereby indexing a workpiece severing position; a slide arranged to be movable in a direction of a Z'-axis parallel to the said B-axis and adapted to be lifted and lowered in the Z'-axis direction by a Z'-axis motor; a spindle head mounted on the said slide and adapted to be moved towards and away from the said workpiece by an X'-axis motor; and a cutting tool mounted to the said spindle head and adapted to be rotated by a spindle motor for severing the said workpiece.

In any of the constructions previously described, the severing machine may alternatively comprise: a left and a right workpiece support means for clamping the workpiece from its opposite left and right hand sides with a workpiece severing center deviated in position from a B-axis parallel to the axis of the workpiece; a B-axis indexing means for rotating the said workpiece about the said B-axis, and thereby indexing a workpiece severing position; a slide arranged to be movable in a direction of a Z'-axis parallel to the said B-axis and adapted to be lifted and lowered in the Z'-axis direction by a Z'-axis motor; a spindle head mounted on the said slide and adapted to be moved towards and away from the said workpiece by an X'-axis motor; and a cutting tool mounted to the said spindle head and adapted to be rotated by a spindle motor for severing the workpiece.

These specific constructions allow the severed workpiece surfaces to be intimately joined together without leaving an opening where they are butted and abutting against each other when the severed workpiece is reduced in diameter, thus permitting piston rings with due roundness quality to be readily obtained. The same specific constructions eliminate the need for manually adjusting a cutter position with respect to a plurality of axes and any other operation at site that is hard and intricate or otherwise requires the operator's skill. The resulting benefit of largely reducing the setup time for a production operation and the added advantage of eliminating the need for a trial machining operation give rise to an enhanced working efficiency.

Also, since a manual adjustment operation is made unnecessary, the apparatus can be attended to without any labor's skill as so far required and can be operated with a minimum development of defective products. Hence both a reduced percent defective and a reduction of product cost ensue.

Any of the constructions described should preferably further include a workpiece carry-in means disposed at a workpiece inlet side of the said interior and exterior working machine; and a workpiece carry-out means disposed at a workpiece outlet side of the said severing machine.

And, there may preferably be included a workpiece transfer means disposed upwards of both the said, interior and exterior working machine and the said severing machine for conveying a workpiece into the said interior-exterior working machine, transferring the workpiece machined in the said interior-exterior working machine over its inside and outside to convey it to the said severing machine, and conveying the workpiece severed in the said severing machine to carry it out of the said apparatus.

These subsidiary features permit all the working steps from introducing a blank workpiece into the combined machining apparatus over to outputting a finished product to be fully automated, rendering the apparatus operable as unattended with a concomitant substantial reduction of labor cost.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings hereof are intended in no way to limit the present invention but to facilitate an explanation and understanding thereof.

In the accompanying drawings.

BEST MODES FOR CARRYING OUT THE INVENTION

Hereinafter, suitable embodiments of the present invention implemented with respect to a combined machining apparatus for making piston rings are set out with reference to the accompanying drawings hereof.

An explanation is now given of a first form of implementation of the present invention.

Figure 1:
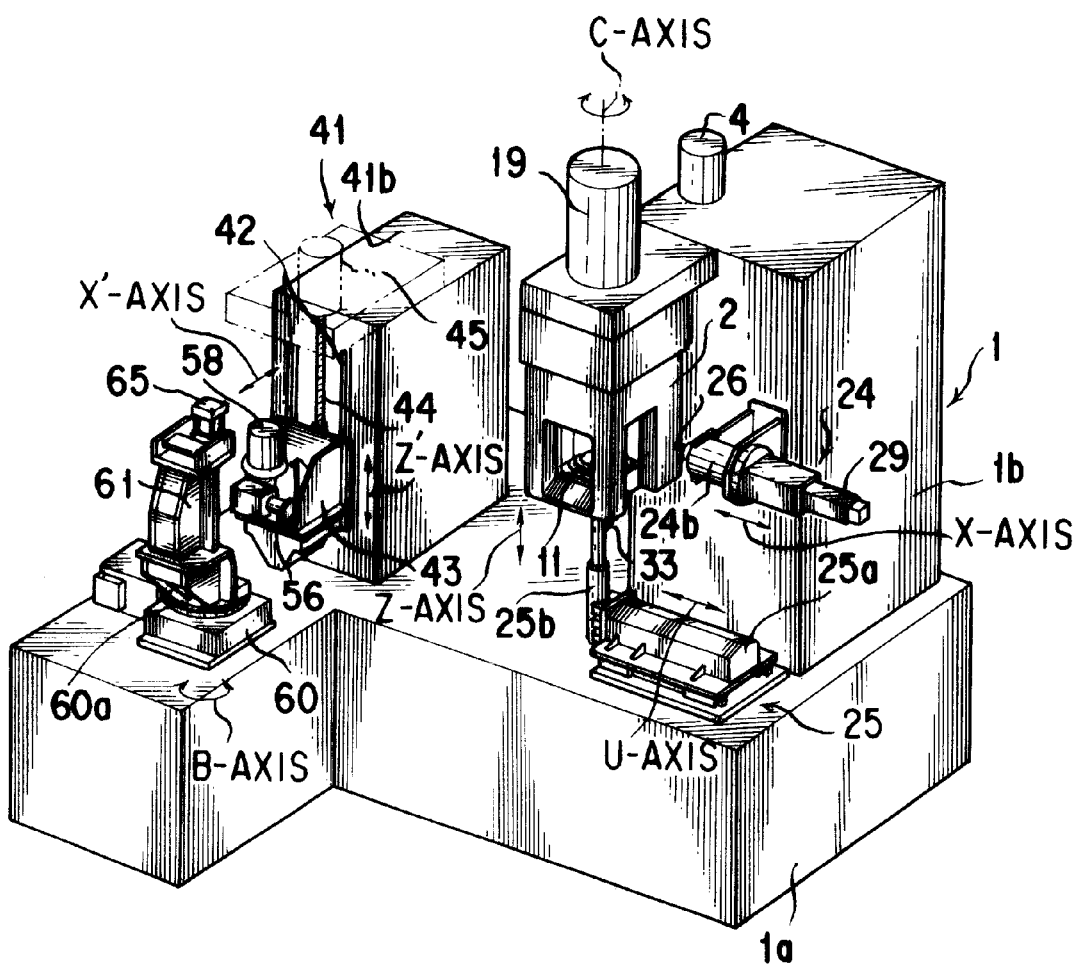
FIG. 1 is a perspective view of a combined machining apparatus to make piston rings that is implemented in a first form in accordance with the present invention.
Figure 2:
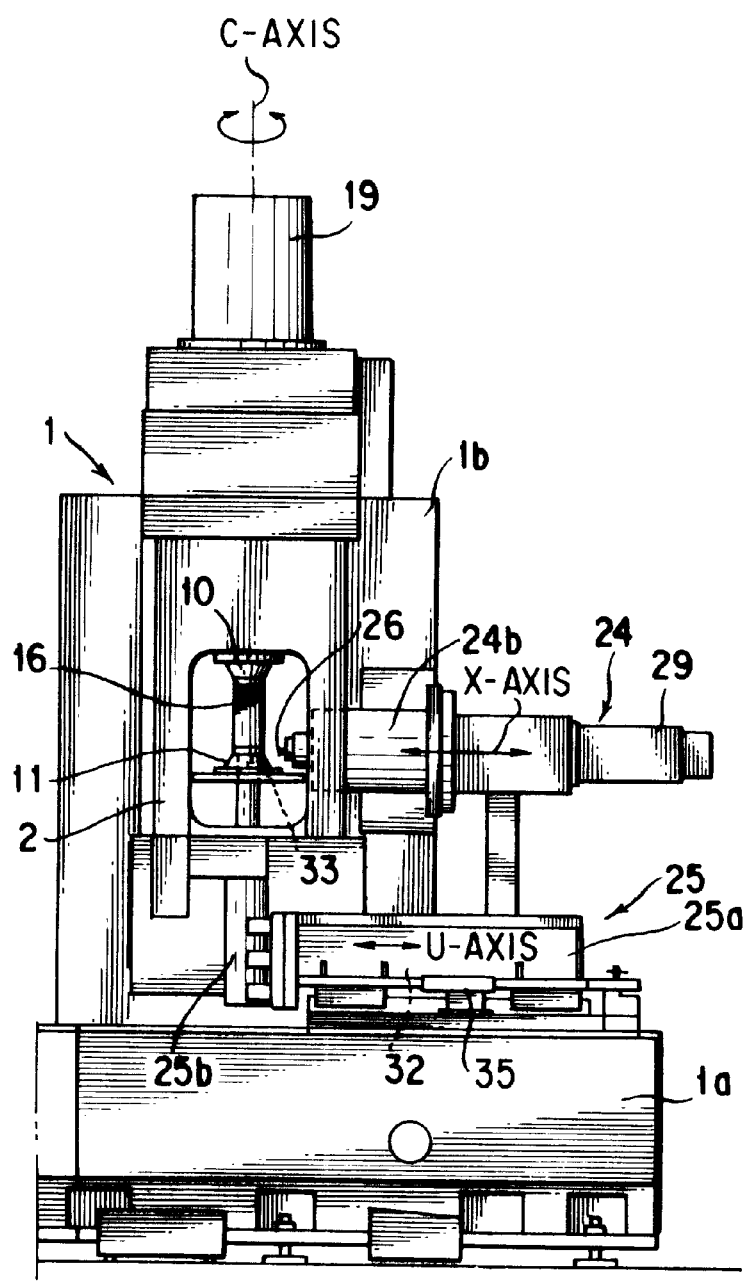
FIG. 2 is a front view of an interior and exterior working machine body that is included in the first form of implementation of the combined machining apparatus.

In FIG. 1 there is shown in a perspective view a combined machining apparatus that can consecutively perform a process of simultaneously machining both inside and outside of a piston ring workpiece and a process of severing the piston ring workpiece with the inside and outside machined. An interior and exterior working machine body 1 and a severing machine body 41 are shown as mounted on a common bed la configured in an L-letter form.

The interior and exterior working machine body 1 has a column 1b mounted on the common bed la. The column lb has in its front side a Z-axis slide 2 that is adapted to be moved vertically up and down (in a direction of Z-axis) by means of a Z-axis drive means 3 (see also FIG. 5).

Figure 3:
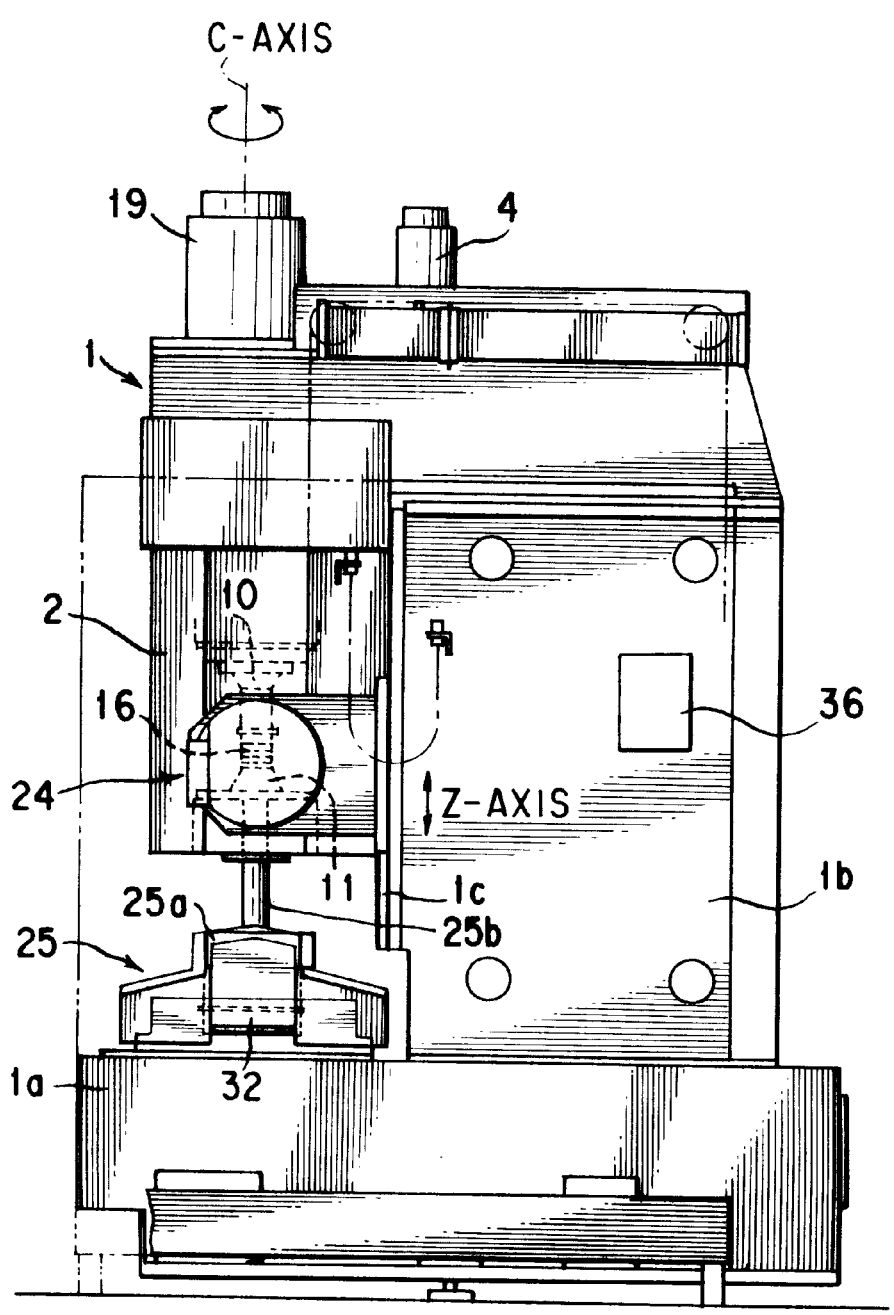
FIG. 3 is a side view of the interior and exterior working machine body in the first form of implementation of the apparatus.
Figure 4:
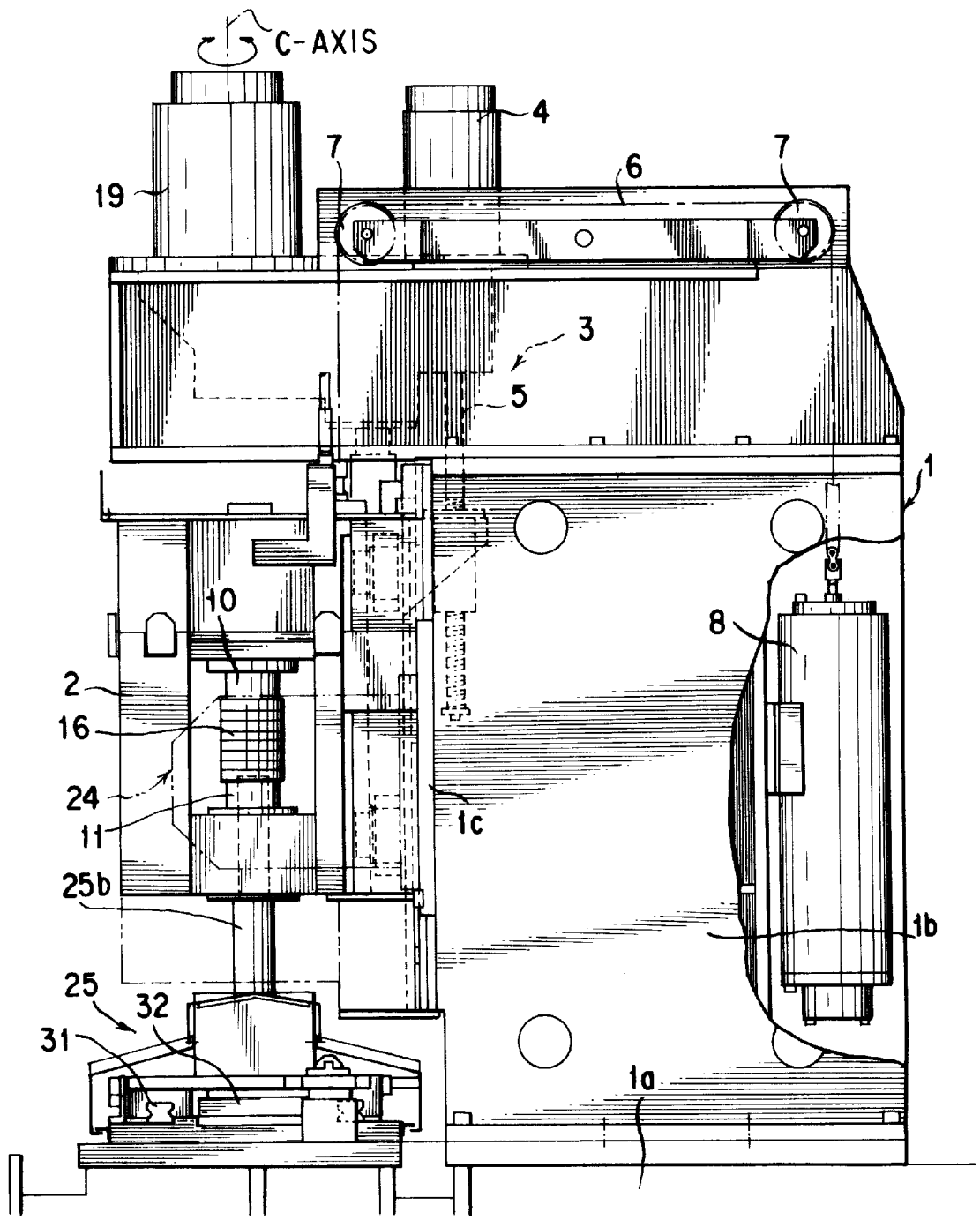
FIG. 4 is an enlarged view of an essential portion of the interior and exterior working machine body in the first form of implementation of the apparatus.

The Z-axis slide 2 as shown in FIG. 3 is carried on a guide rail 1c that comprises a ball type linear guide laid on the face of the column 1b, and is arranged to be movable vertically up and down by a Z-axis motor 4 composed of a servo motor.

Figure 5:
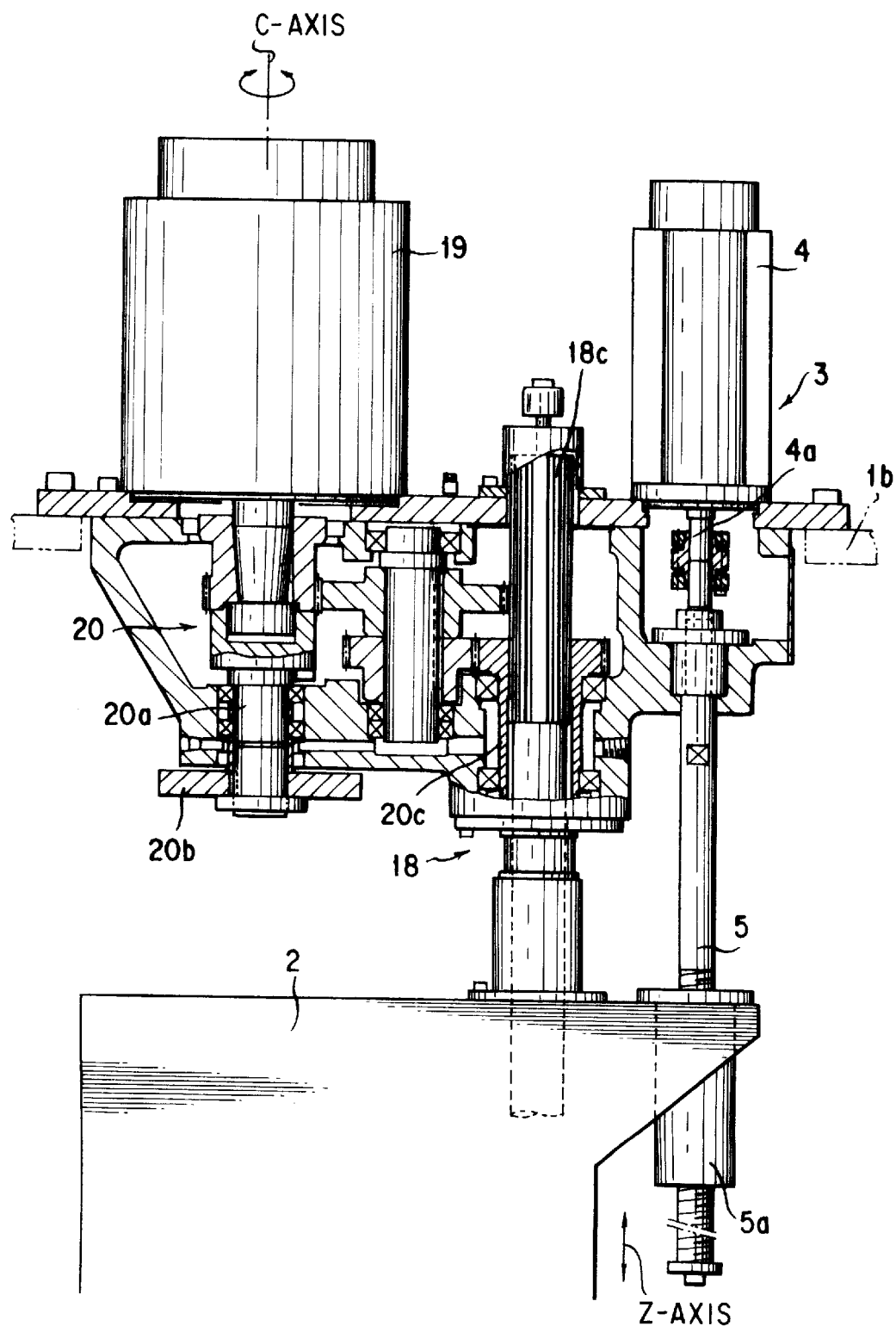
FIG. 5 is a cross sectional view of a C-axis drive means and a Z-axis drive means that are included in the interior and exterior working machine body in the first form of implementation of the apparatus.

Specifically, as shown in FIG. 5 the Z-axis motor 4 has a drive shaft 4a to which a threaded shaft 5 comprising a ball screw is connected. In mesh with the threaded shaft 5 is a nut member 5a that is fastened to the Z-axis slide 2 so that rotating the threaded shaft 5 normally and reversely by the Z-axis motor 4 may cause the Z-axis slide 2 to move vertically along the guide rail 1c. One end of a wire or rope 6 is shown as being bound to the top of the Z-axis slide 2.

The wire or rope 6 has a mid portion wound around a pair of pulleys 7 each of which is carried on the top of the column 1b. The other end of the wire or rope 6 has a counter weight 8 suspended in the rear side of the column 1b so that with the Z-axis slide 2 and the counter weight 8 balanced in gravity, the Z-axis motor 4 of a small capacity may be enough to move the Z-axis slide 2 vertically.

The Z-axis slide 2 also has an upper workpiece support means 10 and a lower workpiece support means 11 that are vertically spaced apart.

Figure 6:
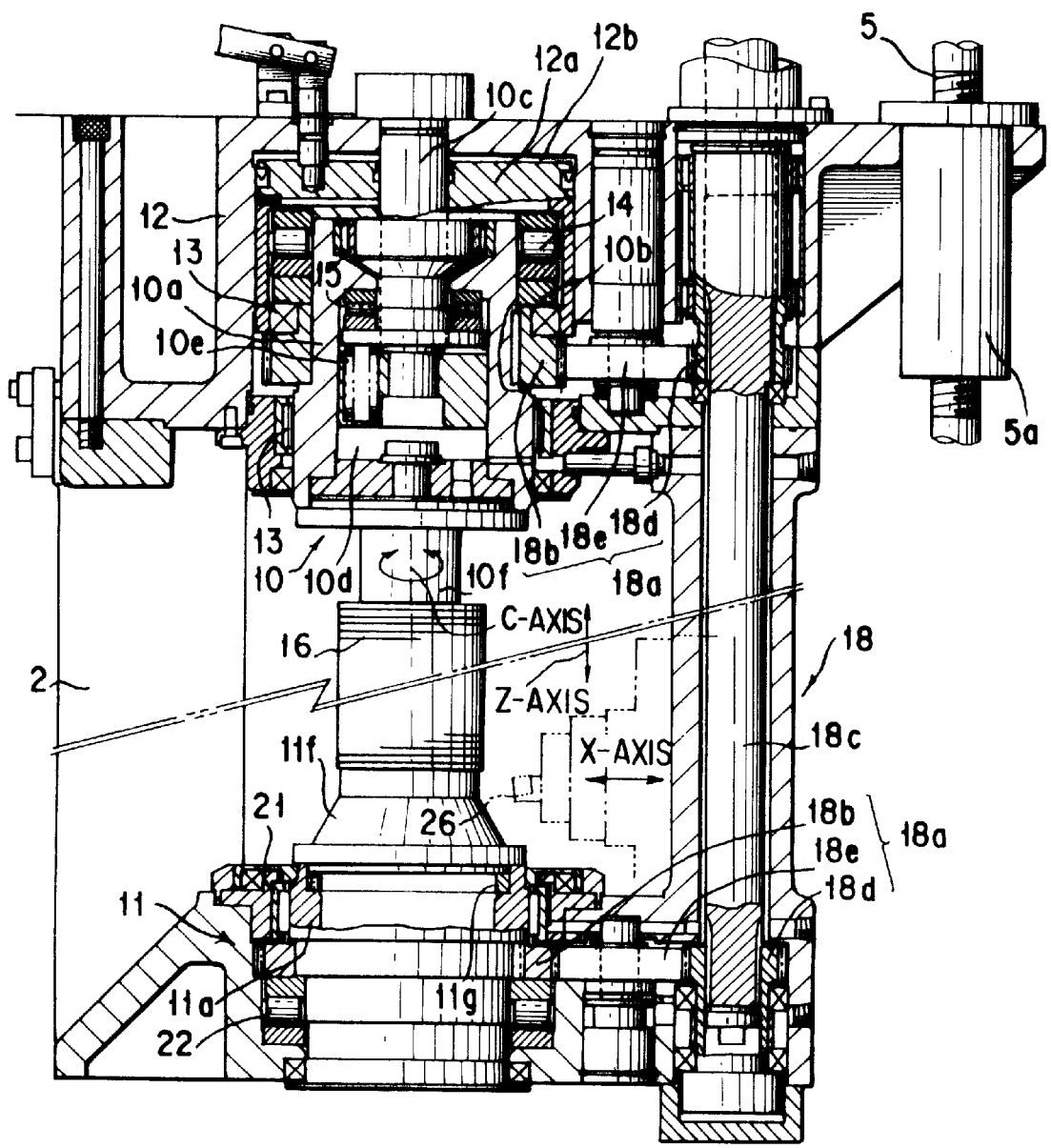
FIG. 6 is a cross sectional view of a workpiece support means that is included in the interior and exterior working machine body in the first form of implementation of the apparatus.

As shown in FIG. 6 the upper workpiece support means 10 is disposed below a hydraulic cylinder 12 arranged at an upper part of the Z-axis slide 2, and has an upper spindle 10a disposed below a piston 12a that is received upwards in the hydraulic cylinder 12.

The upper spindle 10a which is a hollow cylinder is carried via a plurality of bearings 13 to the lower part of the hydraulic cylinder 12 so as to be capable of vertically moving along a C-axis that is parallel to the Z-axis (i. e. the longitudinal axis of the upper spindle 10a) and also of rotating about the C-axis. The lower side surface of the piston 12a is held in a contacting relationship via a thrust bearing 14 with the upper surface of a ring 10b fitted on the upper spindle 10a so that supplying pressure fluid into a fluid chamber 12b of the hydraulic cylinder 12 may urge the upper spindle 10a downwards via the piston 12a.

The hydraulic cylinder 12 has in its center region a fixed shaft 10c whose upper end is fastened to the upper surface of the hydraulic cylinder 12.

The fixed shaft 10c that extends through the piston 12a has its lower end side reaching the center region of the spindle 10a. A plurality of compression springs 10e are disposed on a spring seat 10d formed on the lower end of the fixed shaft 10c to energize the upper spindle 10a upwards via a bearing 15.

The upper spindle 10a is also provided in its lower part with an upper clamp head 10f that clamps a workpiece 16 between it and a lower clamp head 11f included in the lower workpiece support means 11. Keyed and attached around the upper spindle 10a is a follower gear 18b in a gear train 18a that is included in the C-axis drive means 18.

As shown in FIG. 5 the C-axis drive means 18 has a C-axis motor 19 that comprises a servo motor mounted on the top of the column 1b with its output shaft connected to the input shaft 20a of a reducer 20.

The input shaft 20a of the reducer 20 has a fly wheel 20b attached thereto in order to stabilize rotation of the workpiece 16 to prevent it from rotating unevenly. The reducer 20 has its output shaft 20c that is in a spline engagement with an upper end portion of the drive shaft 18c, formed with a spline shaft, for the C-axis drive means 18 so that the drive shaft 18c may be rotated normally and reversely by the C-axis motor 19 via the reducer 20.

The drive shaft 18c is rotatably supported to extend vertically and also parallel to the longitudinal axis of the workpiece 16 and has a mid and a lower portion each of which is in a spline engagement with a drive gear 18d in the gear train 18a that is provided in each of the upper and lower workpiece support means 10 and 11.

Each of the drive gears 18d is set in mesh, via an intermediate gear 18e, with the follower gear 18b that is fitted onto each of the upper and lower spindles 10a and 11a so that then C-axis motor 19 may rotate both the upper and lower spindles 10a and 11a synchronously in a same direction via the drive shafts 18c and the respective gear trains 18a.

The lower spindle 11a is also a hollow cylinder as is the upper spindle 10a and is rotatably supported on the Z-axis slide 2 side via a bearing 21. A thrust bearing 22 is interposed between the Z-axis slide 2 and the follower gear 18b keyed onto the lower spindle 11a.

The lower clamp head 11f for the lower workpiece support means 11 is mounted on the top of the lower spindle 11a to permit the workpiece 16 to be clamped between it and the upper clamp head 10f attached to the upper spindle 10a in the upper workpiece support means 10.

It should be noted at this point that when the upper and lower spindles 10a and 11a are synchronously rotated by the C-axis motor 19, a backlash in the gear trains 18a and a spline in the drive shaft 18c may cause the upper and lower spindles 10a and 11b to rotate unevenly, which results in a deviation in phase of rotation between them.

In order to avoid that, in starting to machine the workpiece 16, a plate 11g shown as fitted between the lower spindle 11a and the clamp head 11f is adapted to be fixed to the lower spindle 11a by a suitable locking means (not shown) such as a lock-tight where a backlash in the upper and lower gear trains is removed.

The machining apparatus 1 further includes, in a mid level of the upper column 1b an exterior machining unit 24 to shape the workpiece 16 with a given outer surface, and on the bed 1a an interior machining unit 25 for shaping the workpiece 16 with a given inner surface simultaneously with the outer surface being shaped.

Figure 7:
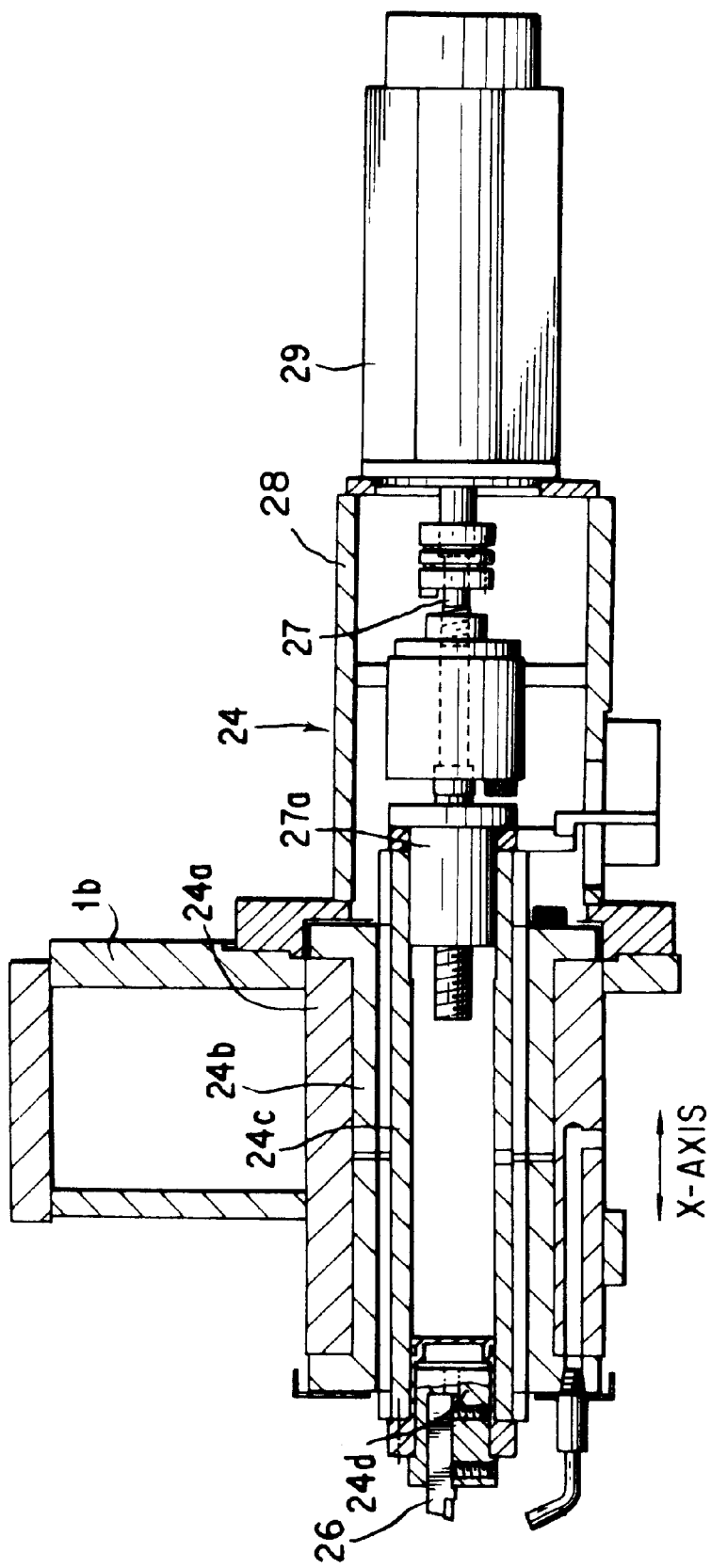
FIG. 7 is a cross sectional view of an exterior machining means that is included in the interior and exterior working machine body in the first form of implementation of the apparatus.

The exterior machining unit 24 comprises a tool support member 24c which as shown in FIG. 7 is supported via a ball spline 24b in a cylindrical guide member 24a fastened horizontally to the column 1b so it may be moved in the direction of an X-axis that is orthogonal to the C-axis.

The tool support member 24c has at its end proximal to the workpiece 16 and removably mounted thereto via a tool mounting member 24d a cutting tool 26 for machining an outside of the workpiece 16. The tool support member 24c has at its opposite end a nut member 27a fastened thereto which is in mesh with one end portion of a threaded shaft 27 that comprises a ball screw which is screwed into it.

The threaded shaft 27 has it other end side coupled to the output shaft of an X-axis motor 29 that comprises a servo motor mounted to the column lb with a bracket 28 so that the X-axis motor 29 rotating the threaded shaft 27 in one and the other directions (normally and reversely) may move the cutting tool 26 towards and away from the workpiece 16.

Figure 8:
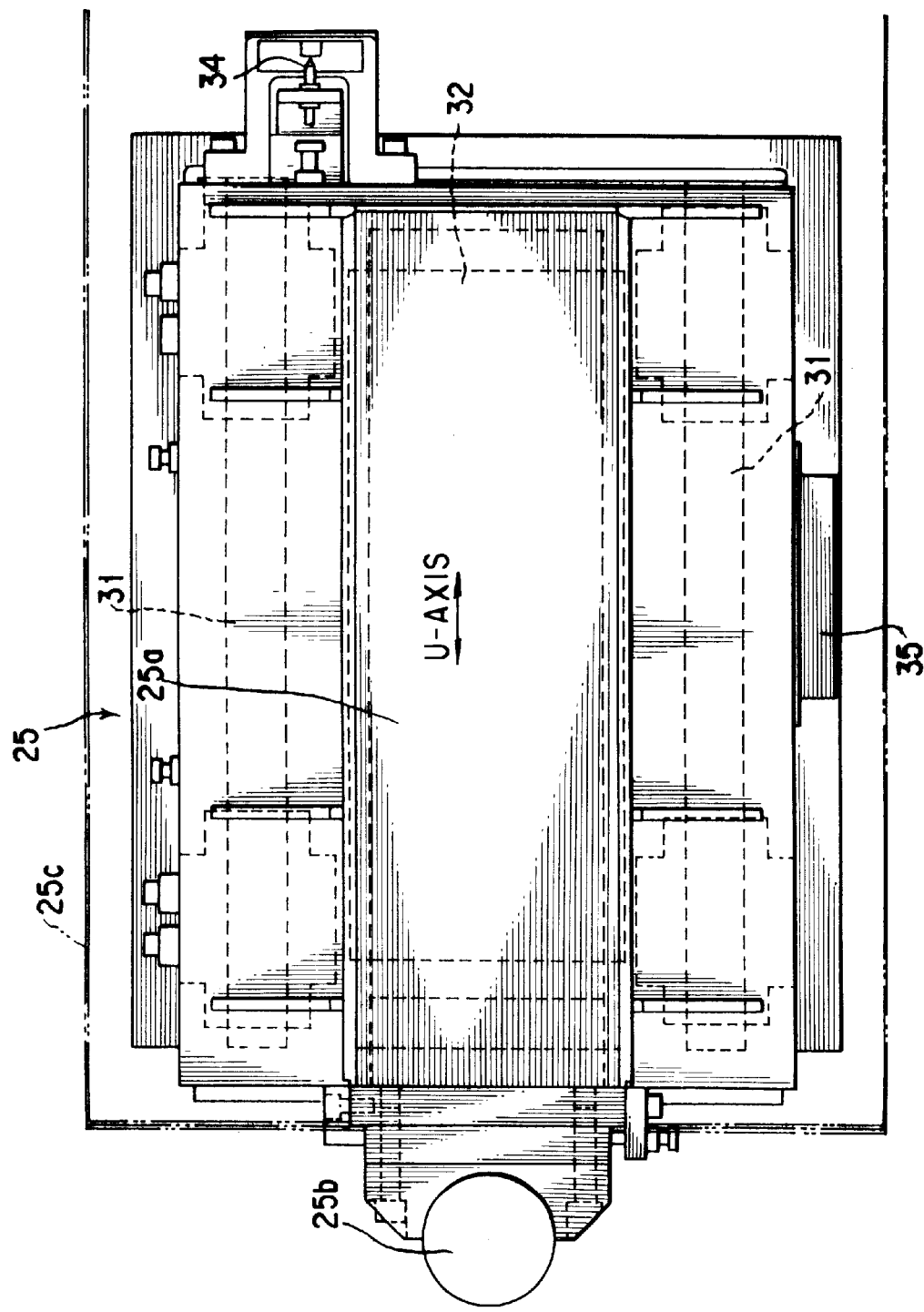
FIG. 8 is a top plan view of an interior machining means that is included in the interior and exterior working machine body in the first form of implementation of the apparatus.
Figure 9:
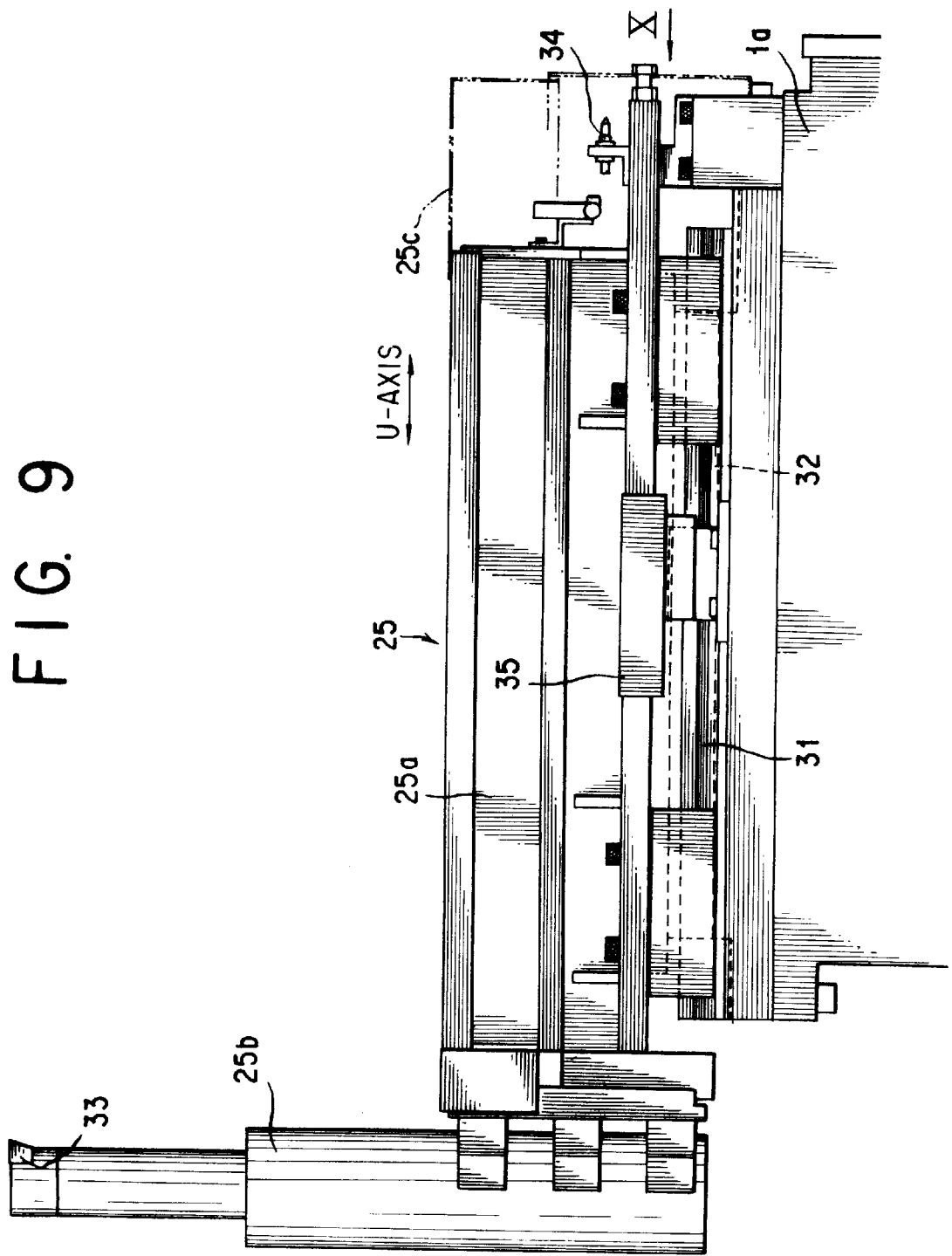
FIG. 9 is a side view of the interior machining means in the interior and exterior working machine body in the first form of implementation of the apparatus.
Figure 10:
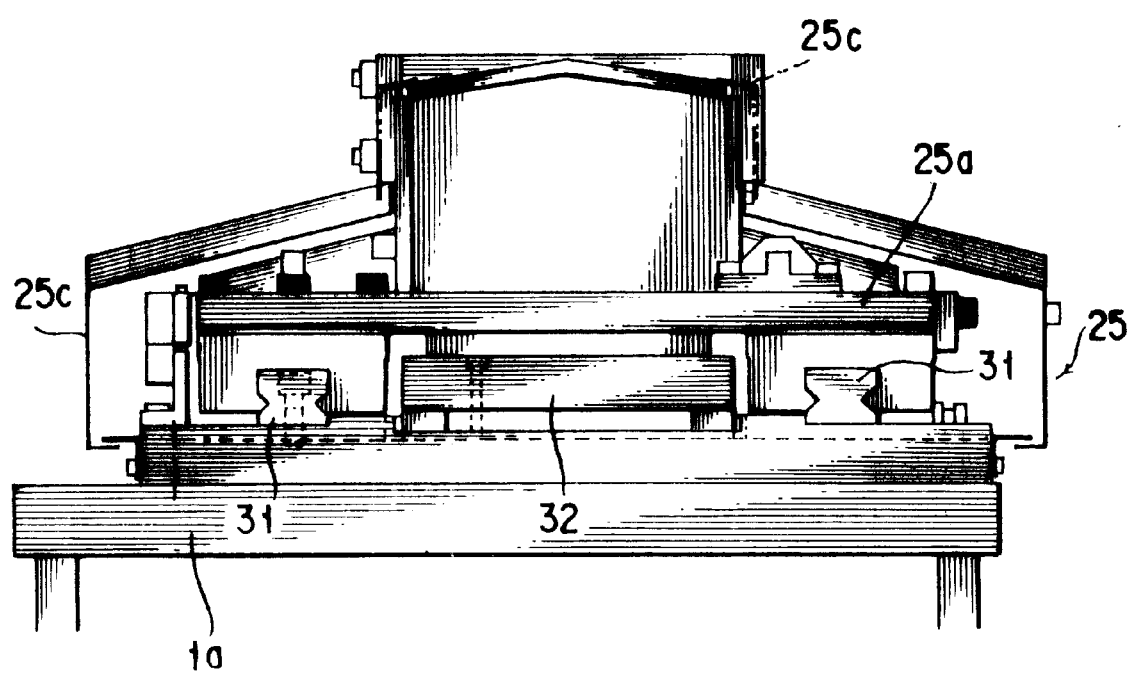
FIG. 10 is a view of the interior machining means as seen in the direction of the arrow X in FIG. 9.

The interior machining unit 25 for shaping an inside of the workpiece 16 includes, as shown in FIGS. 8 to 10, a U-axis slide 25a that is carried on a pair of guide rails 31 each comprising a roller type linear guide which is laid on the bed la to extend in a direction of the U-axis parallel to the X-axis.

A space above the U-axis slide 25a is sealed by a roof cover 25c to ease removal of chips from a cutting zone. To drive the U-axis slide 25a along the U-axis, a U-axis motor 32 comprising a linear servo motor is provided as mounted on the bed la below the U-axis slide 25a.

The U-axis slide 25a has its forward end reaching a point beneath the lower spindle 11a, at which is fastened thereto the lower end of a balling bar 25b as mounted substantially vertically thereto.

The balling bar 25b has an upper end side that past the inside of the lower spindle 11a reaches the inside of the workpiece 16, and has its upper end at which a cutting tool 33 for machining an interior of the workpiece 16 is mounted detachably thereto.

As shown in FIG. 9, the apparatus is also provided with a U-axis origin detector means 34 for detecting the position of an origin of the U-axis slide 25a and a slide detector 35 that may comprise a linear scale for detecting the position of the U-axis slide 25a moving along the U-axis. These detector means 34 and 35 are constructed and arranged to furnish signals into an NC unit 36 (see FIG. 3) that is designed to control the Z-axis motor 4, the C-axis motor 19, the X-axis motor 29, the U-axis motor 32 and so forth.

In addition to the interior and exterior working machine body 1 constructed as so far described, the apparatus includes a severing machine body 41 with a construction as described in detail below with reference to FIGS. 11 to 17.

The severing machine body 41, like the interior and exterior working machine body 1, has a column 41b mounted on the common bed 1a. In front of the column 41b, a pair of guide rails 42 each comprising a linear guide are laid to extend vertically (in a direction of Z'-axis) and a slide 43 is slidably supported to be movable vertically on these guide rails 42.

Between the guide rails 42 is provided a threaded shaft 44 comprising a ball screw that extends parallel to the guide rails 42. In mesh with the threaded shaft 44 is a nut member 44a fixed to the slide 43 side. The upper end of the threaded shaft 44 is connected to a Z'-axis motor 45 comprising a servo motor so that rotating the threaded shaft 44 normally and reversely by the Z'-axis motor 45 may cause the slide 43 to move in the direction of Z'-axis.

Figure 11:
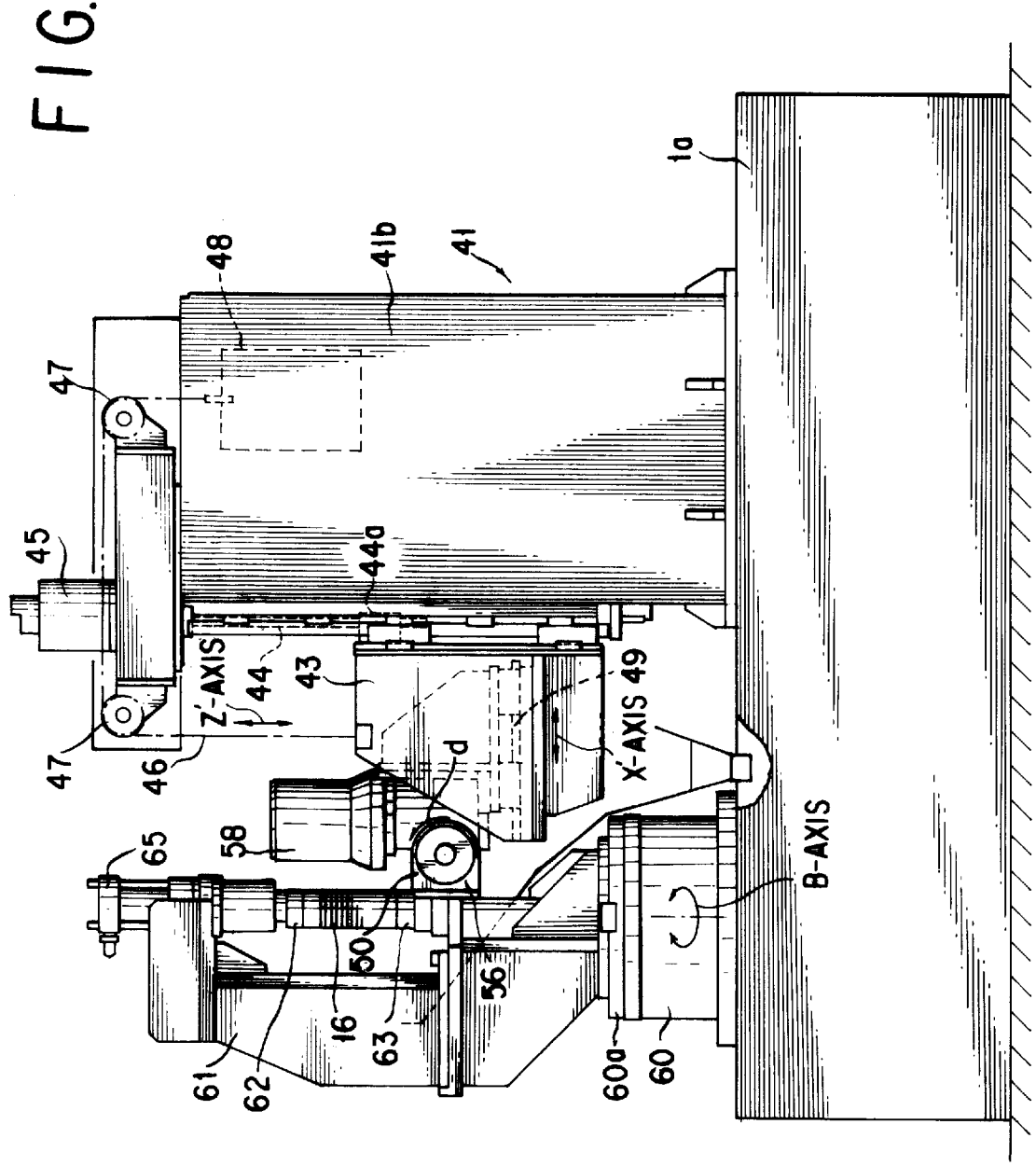
FIG. 11 is a front view of a severing machine body that is included in the first form of implementation of the combined machining apparatus.
Figure 12:
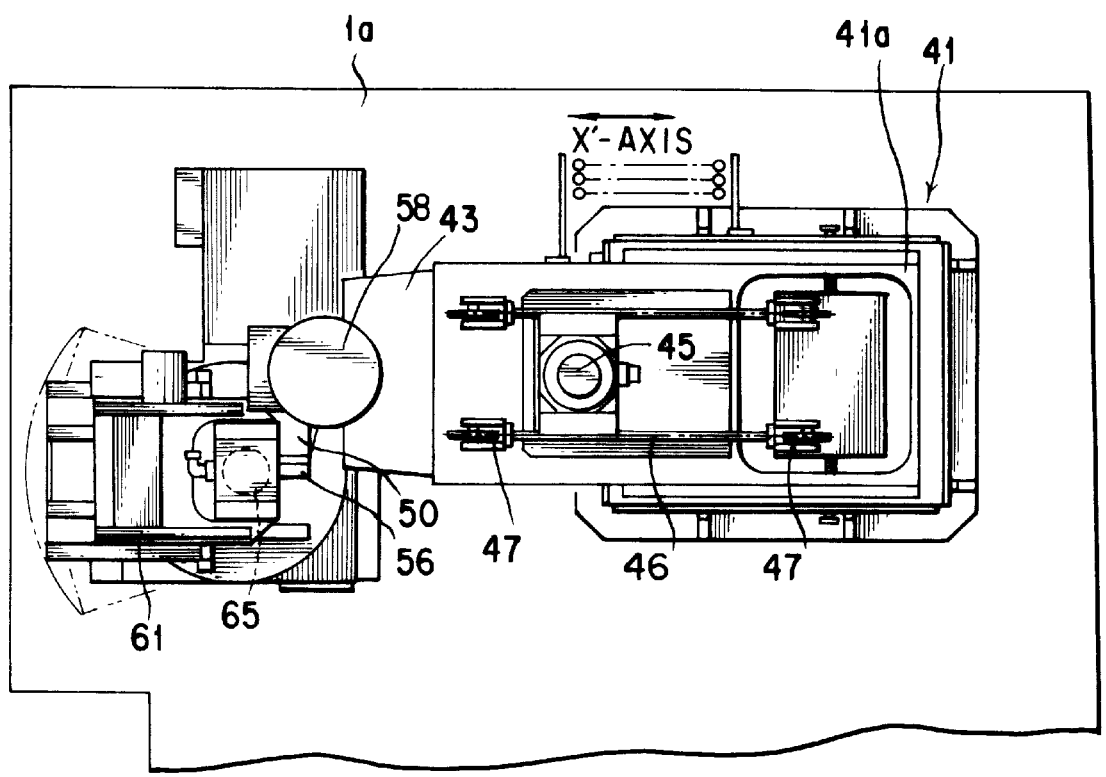
FIG. 12 is a top plan view of the severing machine body in the first form of implementation of the apparatus.
Figure 13:
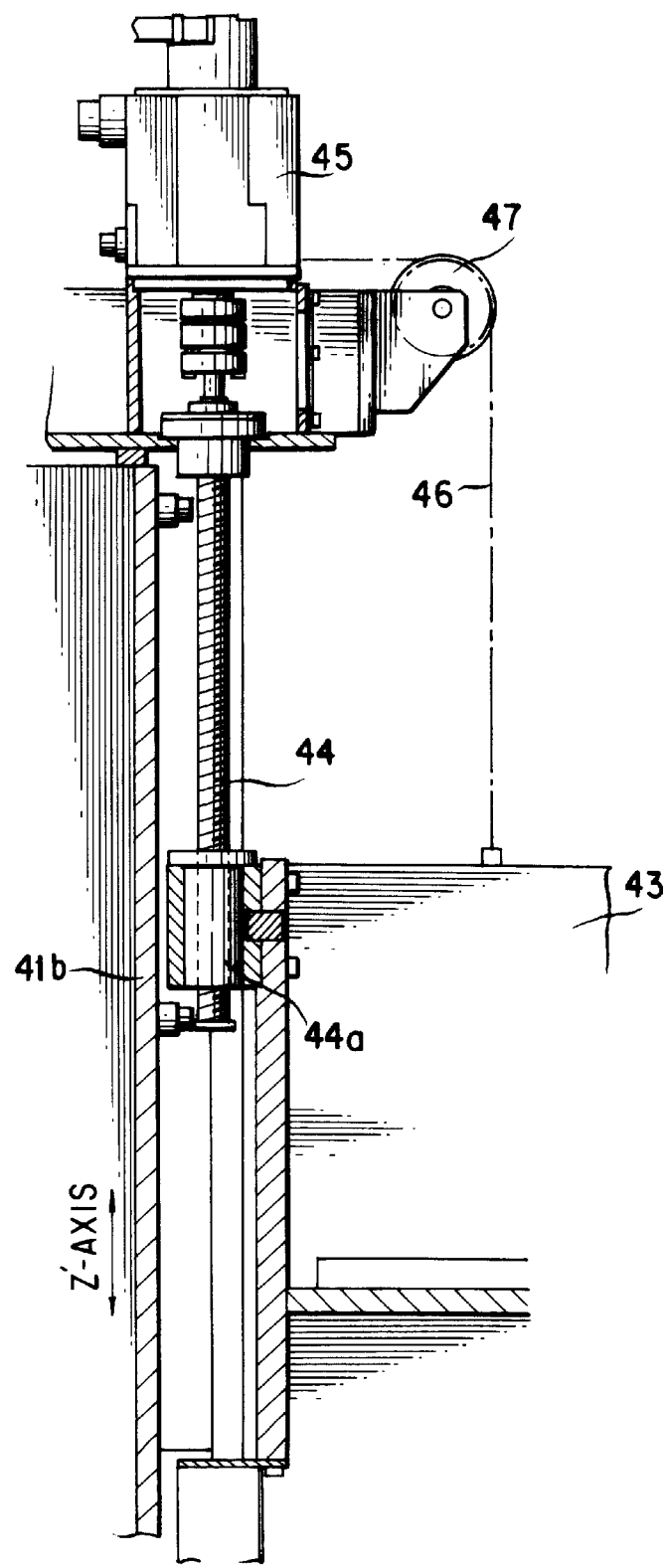
FIG. 13 is a view showing in detail a region of a Z'-axis motor that is included in the severing machine body in the first form of implementation of the apparatus.

As shown in FIGS. 11 and 13, one end of a cordage (wire or rope) 46 is shown as being bound to the top of the slide 43.

The cordage 46 has a mid portion wound around a pair of pulleys 47 each of which is carried on the top of the column 41b. The other end of the cordage 46 has a counter weight 48 suspended in the rear side of the column 41b so that with the slide 43 and the counter weight 48 balanced in gravity, the Z'-axis motor 45 of a small capacity may be enough to move the slide 43.

Also, the upper surface of the slide 43 has, as shown in FIG. 11, a pair of guide rail 49 comprising a linear guide laid thereon to extend horizontally (in a direction of X'-axis), and a spindle head 50 is supported on these guide rails 49 so as to be movable in the direction of X'-axis.

Figure 14:
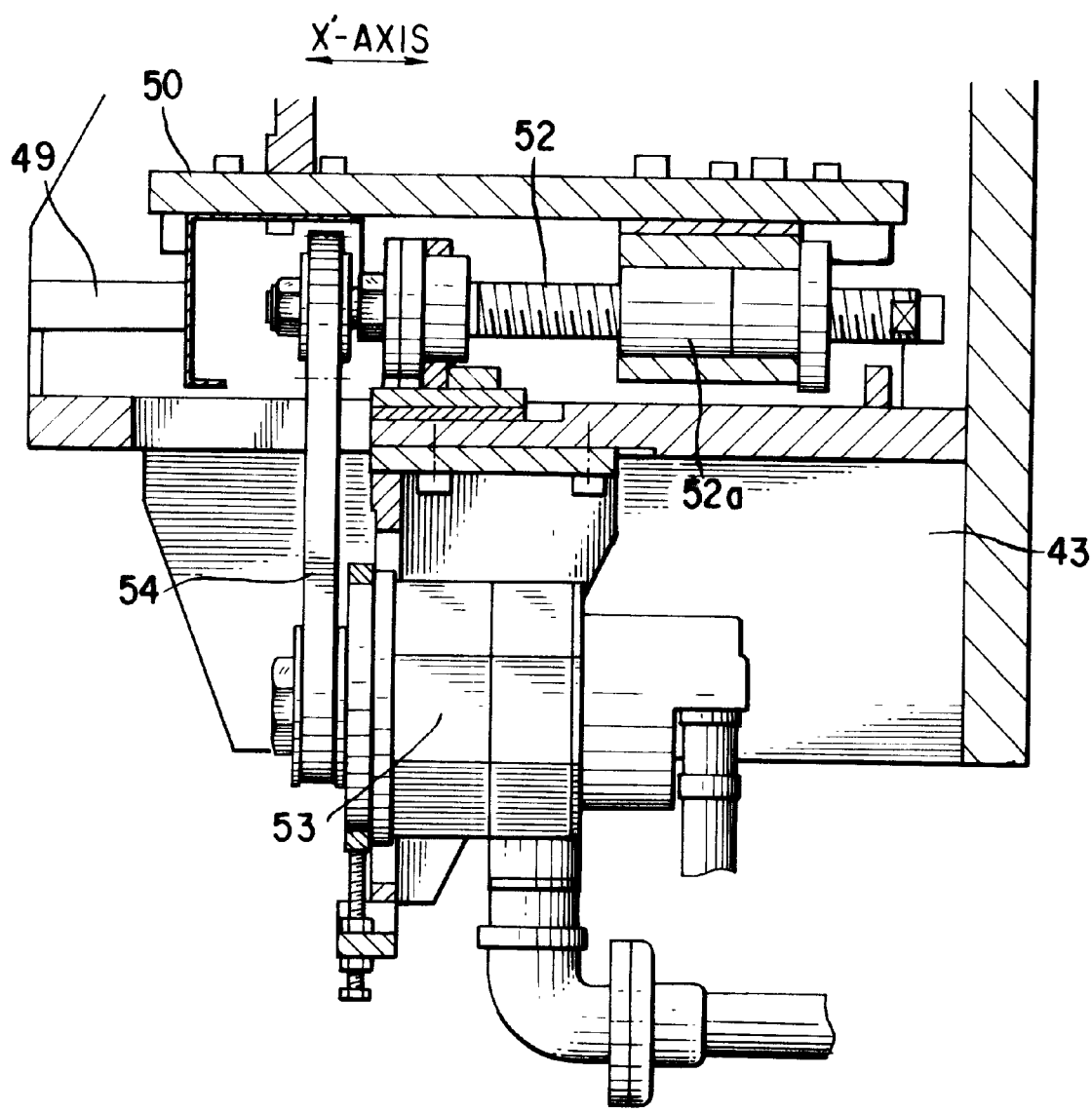
FIG. 14 is a view showing in detail a region of an X'-axis motor that is included in the severing machine body in the first form of implementation of the apparatus.

Below the spindle head 50 as shown in FIG. 14 is arranged a threaded shaft 52 comprising a ball screw to extend parallel to the guide rails 49. The threaded shaft 52 is arranged in mesh with a nut member 52a fastened to a lower extension of the spindle head 50. One end of the threaded shaft 52 is coupled via an endless belt 54 to an X'-axis motor 53 comprising a servo motor disposed at the slide 43 side so that rotating the threaded shaft 52 normally and reversely by the X'-axis motor 53 may move the spindle head 50 in the direction of X'-axis.

Figure 15:
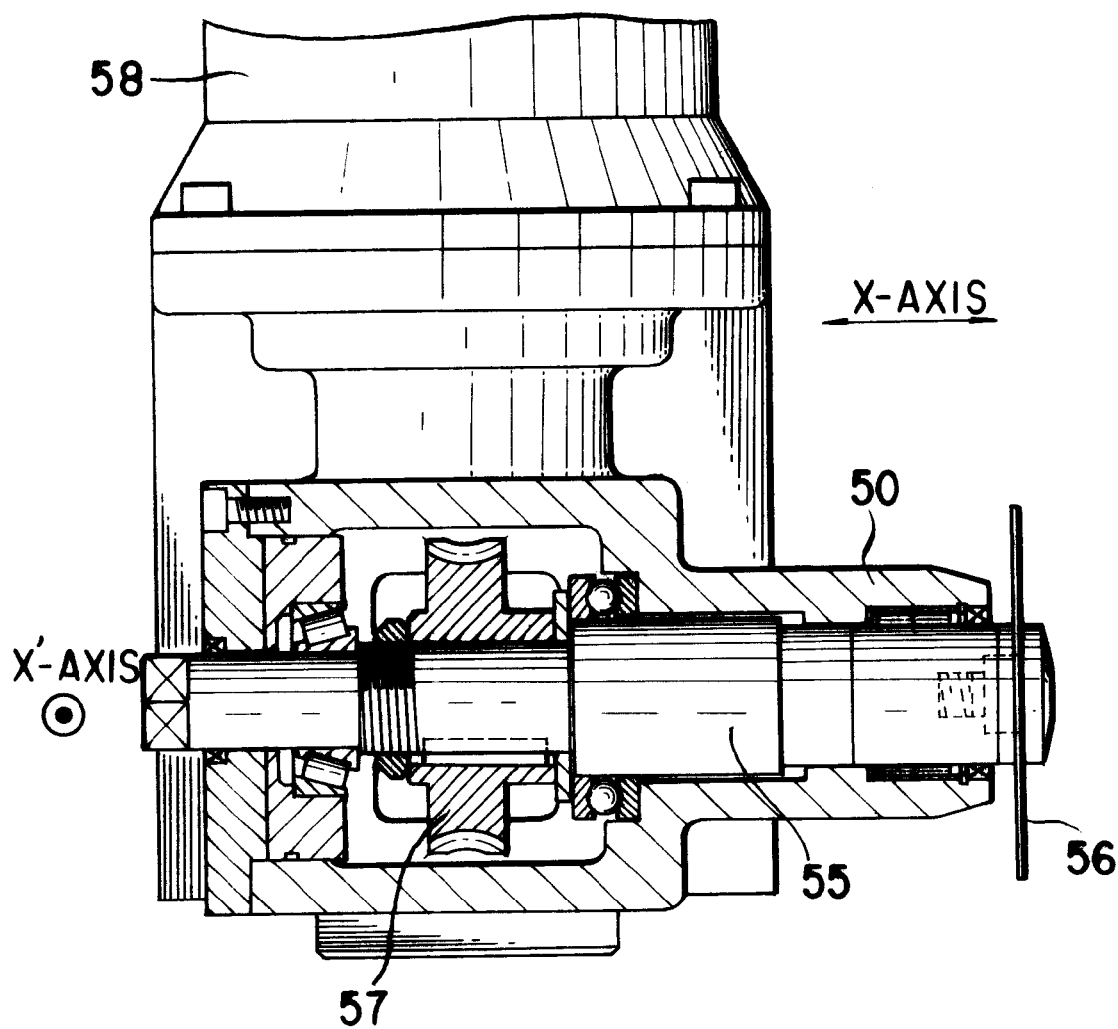
FIG. 15 is a view showing in detail a region of an spindle motor that is included in the severing machine body in the first form of implementation of the apparatus.
Figure 16A:
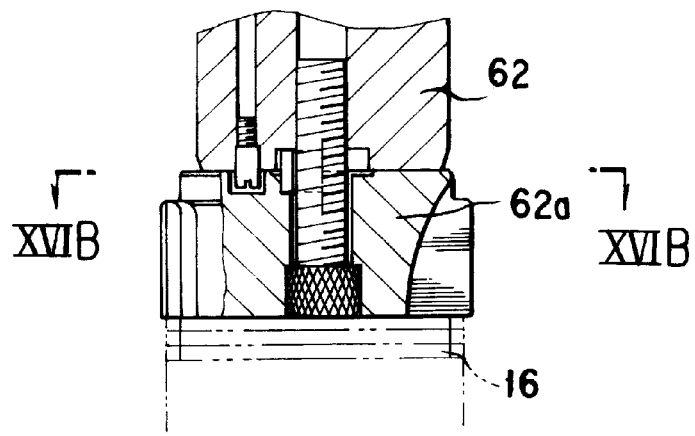
FIG. 16A is an enlarged view of an upper workpiece support means that is included in the severing machine for severing a spindle ring workpiece in the first form of implementation of the apparatus.
Figure 16B:
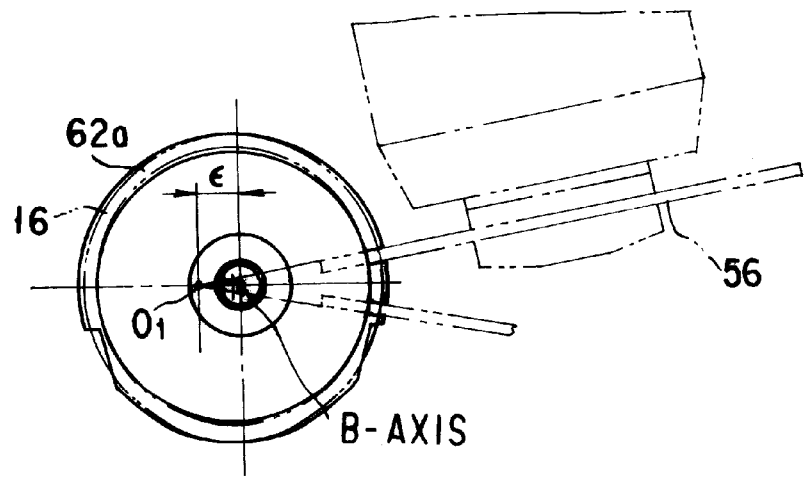
FIG. 16B is a sectional view of the upper workpiece support means along the line XVIB in FIG. 16A.
Figure 17A:
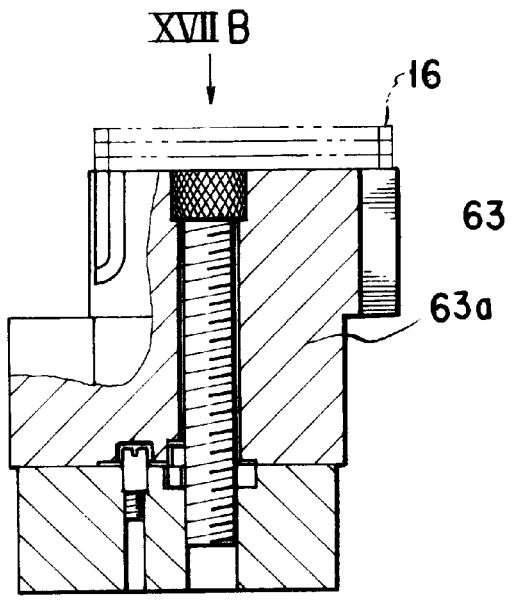
FIG. 17A is an enlarged view of a lower workpiece support means that is included in the severing machine for severing a spindle ring workpiece in the first form of implementation of the apparatus.
Figure 17B:
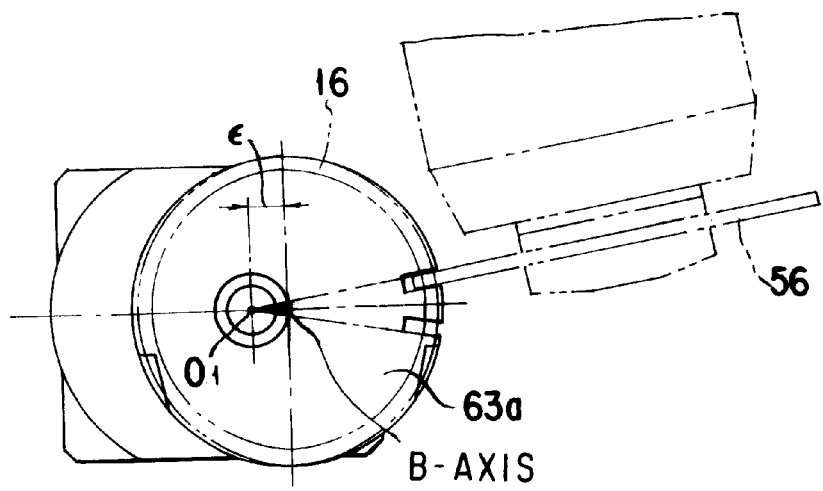
FIG. 17B is a view of the lower workpiece support means as seen in the direction of the arrow XVIIB in FIG. 17A.

As shown in FIG. 15, the spindle head 50 has a spindle 55 supported thereby rotatably in a direction orthogonal to the X'-axis.

The spindle 55 has one end side to which a cutting tool 56 comprising a metal saw is detachably mounted and the other end side connected via a worm type reducer 57 to a spindle motor 58 comprising a general purpose motor as controllable by an inverter to rotate the spindle 55 and thus the cutting tool 56.

Also, as shown in FIG. 11 the common bed la has a B-axis indexing means 60 mounted thereon at a site opposite to the column 41b across the slide 43.

The B-axis indexing means 60 has an upper part that includes an indexing table 60a adapted to be rotated about a B-axis for indexing. Mounted on the indexing table 60a is a support frame 61 configured in a C-letter form.

The support frame 61 carries an upper workpiece support means 62 and a lower workpiece support means 63 vertically spaced apart with a center lying on the B-axis.

In a region where each of the upper and lower workpiece support means 62 and 63 are opposing to the other, there is disposed a clamp head 62a, 63a. The clamp heads 62a and 63a are adapted to clamp from the upper and lower sides the opposite ends of a workpiece 16 comprising a stack of non-circular rings brought and held together in its axial direction, while establishing a workpiece severing center O1 as deviated in position from the B-axis by a distance E The clamp head 62a of the upper workpiece support means 62 is arranged to be movable vertically up and down by means of a clamping cylinder 65 mounted on or upwards of the support frame 61.

And, the Z'-axis motor 45, X'-axis motor 53, the spindle motor 58 and the B-axis indexing means 60 are adapted to be numerically controlled by an NC unit 36 with severing machining data preliminarily input and stored.

An explanation will now be given of an operation for machining a workpiece 16 destined to provide piston rings with the apparatus constructed as so far described.

Figure 18:
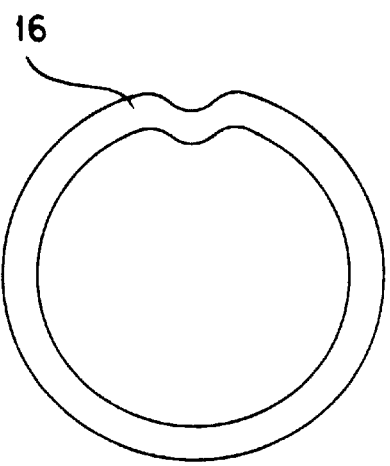
FIG. 18 is a top plan view of a workpiece to be machined by the interior and exterior working machine body in the first form of implementation of the apparatus.

Such a workpiece 16 to be machined is represented as shown in FIG. 18 in cross section having outer and inner surfaces that are curved to be non-circular and different in curvature or geometry. It then becomes essential to NC (numerically control) the exterior and interior machining means 24 and 25 separately and independently.

Further, in order for both inside and outside of the workpiece 16 that is being rotated by the C-axis motor 19 to be simultaneously machined, the X-axis, U-axis and Z-axis motors 29, 32 and 4 must be operated synchronously with the C-axis motor 19 under NC, and to this end, a standard cycle control makes it time-consuming to process movement data and therefore is inadequate to adopt.

Accordingly, the first form of implementation of the invention described is designed to adopt either a rapid cycle control in operating the NC unit 36 or a DNC mode for a machining purpose as described.

When a rapid cycle control mode is adopted in operating the NC unit 36, data converted for a movement to be effected per unit processing time for each axis, a number of its cycles of repetition and so forth are registered in the data area and the header prepared for this control mode in the NC unit 36 to permit the latter to be operated in this mode under a main program for machining.

In initiating a machining operation, a plurality of non-circular rings are laminated or stacked in phase to form a hollow cylindrical workpiece 16. The workpiece 16 is then clamped with a pair of hand carrier jigs not shown from the upper and lower sides and, as it is held so, is carried into the machining apparatus body 1 so as to be set between the clamp heads 10f and 11f provided respectively on the upper and lower spindles 10a and 11a.

With the workpiece 16 so set, the pressure chamber 12b in the hydraulic cylinder 12 is supplied with pressure fluid to lower both the piston 12a and the upper spindle 10a and thereby to firmly clamp, between the clamp head 10f on the upper spindle 10a and the clamp head 11f on the lower spindle 11a, the workpiece 16 with its longitudinal axis held coincident with the common axis of the upper and lower spindles 10a and 11a.

The workpiece 16 is phase-indexed in that state. Then, driving the C-axis motor 19 causes the upper and lower spindles 10a and 11a to be synchronously rotated with the C-axis drive means 18, thereby driving the workpiece 16 into rotation. The cutting tool 26 in the exterior machining unit 24 and the cutting tool 33 in the interior machining unit 25 are now ready to engage, both, say, from their lower end sides, the outer and inner surfaces of the workpiece 16 to shape both these surfaces simultaneously.

Here, in order to impart to the hollow cylindrical workpiece 16 outer and inner sculptured surfaces or contours given that vary in curvature or geometry, the X-axis and the U-axis motors 29 and 32 are operated independently of each other and in synchronism with the C-axis workpiece rotation under NC to so machine the workpiece 16 synchronously both outside and inside. And, as machining proceeds, the Z-axis motor 4 is controllably driven to so move the Z-axis slide 2 downwards to permit the workpiece 16 to be machined both inside and outside over its given entire length. In the course of machining, it should be noted that those chips produced and emitted from the inside of the workpiece 16 are allowed to fall off through the inside of the lower spindle 11a downwards. A possible damage of the machined surfaces by such chips is thereby avoided. A possible damage of the cutting tool 33 as a result of chips striking through a gap between the workpiece 16 and the cutting tool 33, reducing its serviceable life, is also avoided thereby, so is machining inaccuracy as caused by such chips.

After the workpiece 16 has been machined, the X-axis motor 29 and the U-axis motor 32 are driven to move the tool support member 24c and the U-axis slide 25a back to their original positions and the X-axis motor 4 is driven to move the Z-axis slide 2 upwardly back to its original position. Thereafter, discharging a pressure fluid from the pressure chamber 12b in the hydraulic cylinder 12, permitting the upper spindle 10a to rise under the action of the compression spring 10e unclamps the workpiece 16.

After the workpiece 16 is so unclamped, the hand carrier jigs are used to clamp the workpiece 16 from the upper and lower sides and to carry it out from the space between the clamp heads 10f and 11f. Then, using a workpiece transfer means (not shown) such as a general purpose robot, the workpiece 16 so held clamped is carried from the interior and exterior working machine body 1 and is conveyed to a severing machine body 41 mounted adjacent thereto on the common bed 1a, where the workpiece 16 is severed.

Figure 19:
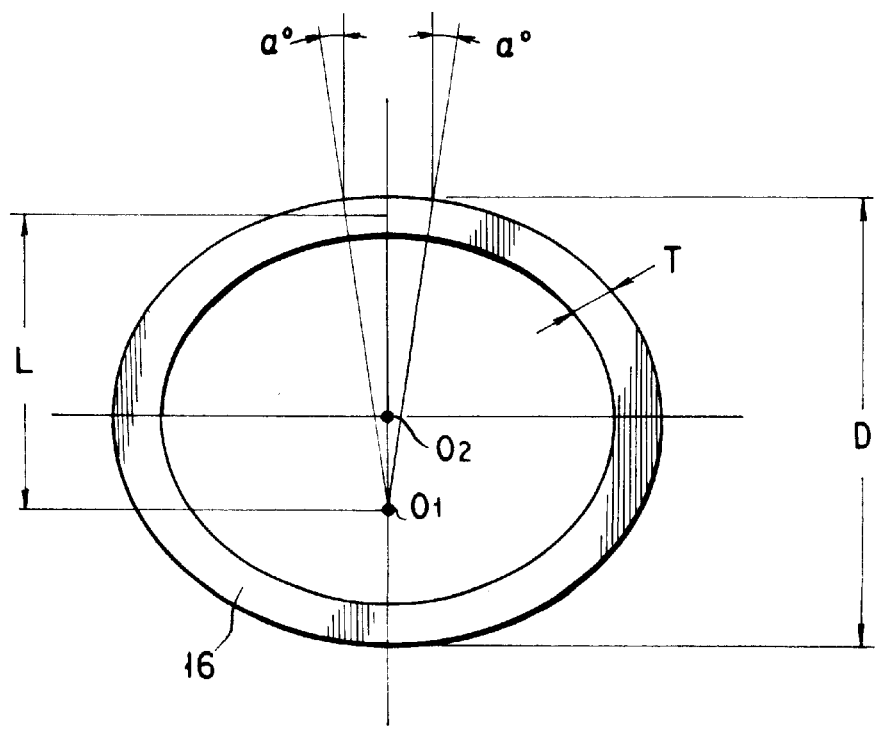
FIG. 19 is an explanatory view illustrating the sizes of portions of the piston ring workpiece to be severed.

In severing the workpiece 16, it should be noted that machining data for the following variables as shown in FIG. 19 are preliminarily input and stored in the NC unit 36.

L: Severing machining size

D: Reference machining diameter a Severing angle

T: Width of workpiece

Figure 20A:
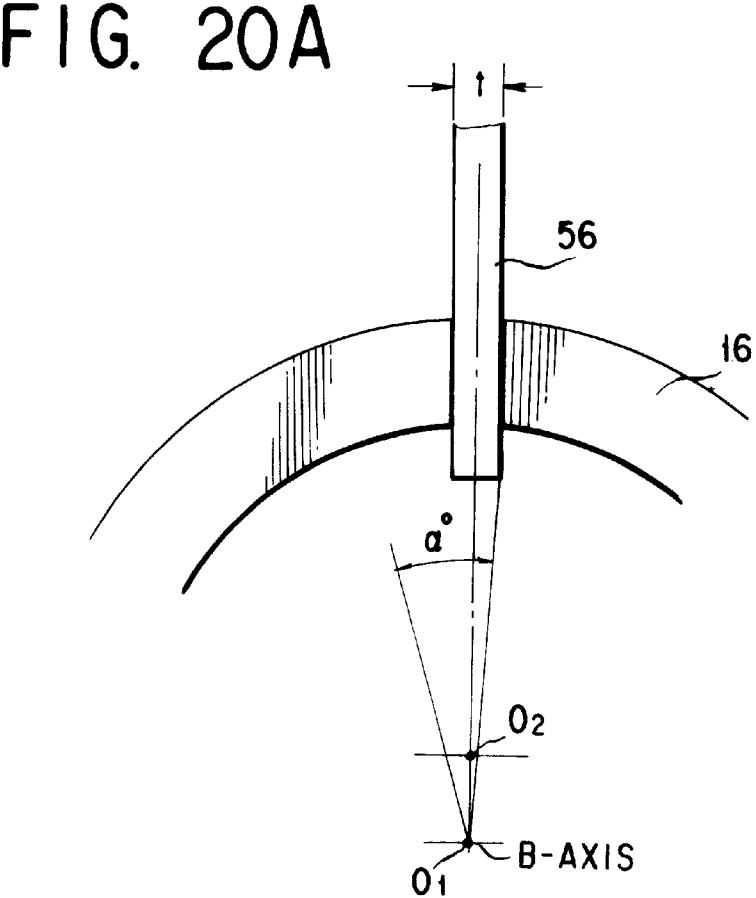
FIGS. 20A and 20B are explanatory views illustrating an inconvenience that happens when a severing center is laid in coincidence with a B-axis.
Figure 20B:
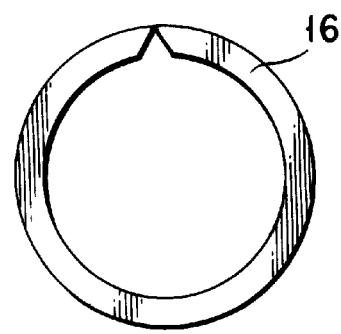

Also, when the workpiece 16 machined over its inner and outer surfaces by the interior and exterior working machine body 1 is introduced in the workpiece transfer means between the upper and lower workpiece support means 62 and 63 of the severing machine body 41, it should be noted that if the workpiece 16 were positioned between them so as to set the workpiece severing center O1 to coincide with the B-axis of the B-axis indexing means 60 as shown in FIG. 20A and then severed, the thickness t of the cutting tool 56 would have the severed workpiece 16 when reduced in diameter leave an opening where its severed surfaces are butted and abutting against each other as shown in FIG. 20B. A piston ring as desired is then not obtainable.

Figure 21A:
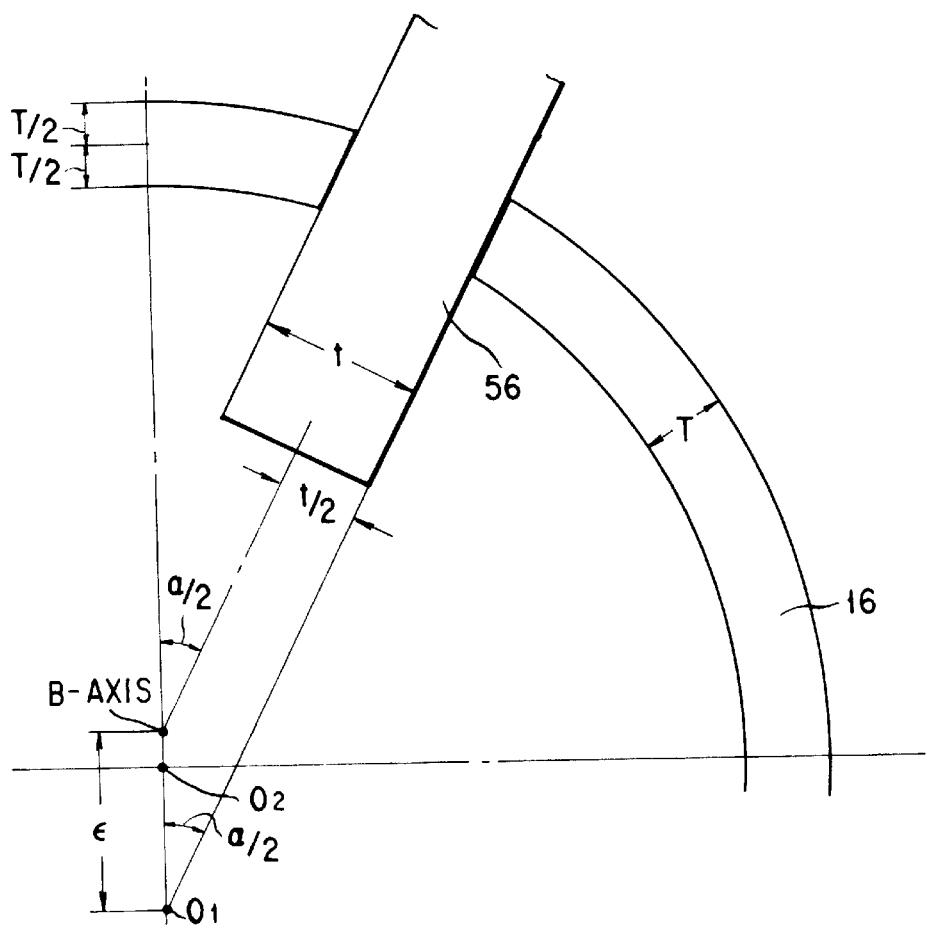
FIGS. 21A and 21B are explanatory views illustrating a method of severing a piston ring workpiece with the machining apparatus in the first form of implementation.

Therefore, an apparatus according to the present invention as implemented in the form described is designed to take into account the thickness t of the cutting tool 56 and to position the workpiece 16 when clamped between the upper and lower workpiece support means 62 and 63 so as to set the workpiece severing center O1 to lie as shown in FIG. 21A, removed beyond the center O2 of the workpiece 16 from the B-axis by a distance e calculated by the equation that follows.

Thus, assuming the thickness of the cutting tool to be t, the severing angle about the B-axis to be α and the workpiece 16 to have a width T as shown in FIG. 21A, there stands the equation:

$$(t/2)/\epsilon = \sin(\Delta/2)$$

Therefore, $$\epsilon = (t/2)/\sin(\Delta/2).$$

Thus, upon computing the value of deviation $\epsilon$ from this equation, the workpiece 16 is positioned between the upper and lower workpiece support means 62 and 63 so as to set the severing center O1 to lie as shown in FIG. 21A, removed beyond the center of the workpiece 16 from the B-axis by a distance in the amount of deviation $\epsilon$ computed.

To facilitate so positioning the workpiece 16 with accuracy, the upper and lower workpiece support means 62 and 63 are each provided with a jig designed to achieve this.

The line that extends from the flank of the cutting tool 56 thus crossing the severing center O1 with an angle that is equal to one half the severing angle α with respect to the center line passing through the B-axis, the center O2 of the workpiece 16 and the severing center O1, it can be seen that indexing the severing angle α for the workpiece 16 about the B-axis of the workpiece 16 permits a piston ring with an enhanced roundness quality to be obtained.

After the workpiece 16 has been set and positioned as described, we may now proceed to its severing operation in an automatic cycle under control by the NC unit 36.

First, commands from the NC unit 36 cause the spindle motor 58 to drive the cutting tool 56 into rotation in the direction of the arrow d indicated in FIG. 11 and the B-axis indexing means 60 to turn the indexing table 60a by a severing angle a about the B-axis, thereby indexing a first site to be severed.

Figure 22A:
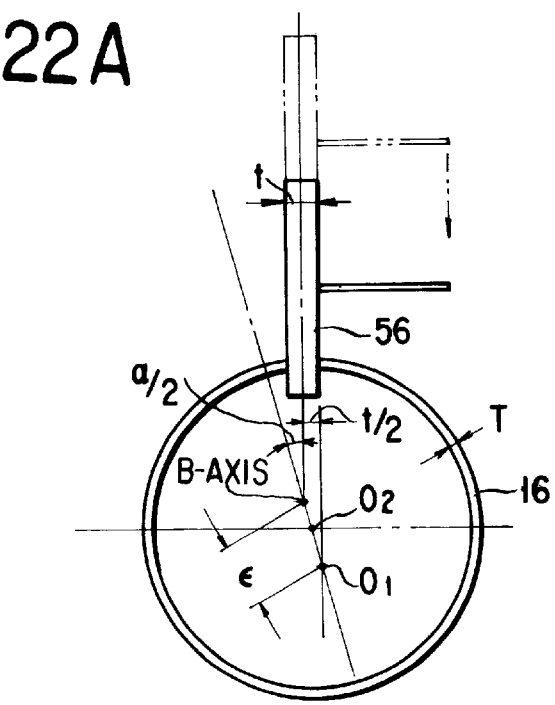
FIGS. 22A and 22B are process views illustrating the method of severing a piston ring workpiece with the machining apparatus in the first form of implementation.

Next, the X'-axis motor 53 is driven into rotation to cause the threaded shaft 52 to move the spindle head 50 in the direction of X'-axis and thereby to advance the rotating cutter tool 56 as shown in FIG. 22A until it reaches a severing position below the workpiece 16.

Thereafter, the Z'-axis motor 45 is driven into rotation to cause the threaded shaft 44 to move the slide 43 upwards in the direction of Z'-axis, thus permitting the workpiece 16 to be cut from its lower end side with the cutting tool 56 carried by the slide 43.

Then, as the slide 43 rises the workpiece 16 continues to be severed towards its upper end side from its lower end side with the cutting tool 56. The cutting tool 56 approaching the upper end side of the workpiece 16 finishes its severing. Then, after the X'-axis motor 54 returns the spindle head 50 to its original position, the slide 43 is moved downwards by the Z'-axis motor 45 to its original position.

After the first severing site has been severed as described above, the indexing table 60a in the B-axis indexing means 60 is turned in the direction opposite to the above in order to index a next severing site. Then, turning the indexing table 60a about the B-axis by a severing angle a would cause the workpiece 16 to be excessively cut by the thickness t of the cutting tool 56 and the workpiece 16 so cut when reduced in diameter to be deficient in roundness quality as shown in FIG. 21B.

Off-setting the cutting tool 56 to displace in the direction of X-axis by an amount corresponding to the thickness t of the cutting tool 56 (see FIG. 15) may avoid such an inconvenience but, requiring an additional mechanism and a control axis therefor, may well complicate the machine structure and system configuration of the apparatus.

This inconvenience is circumvented by the present invention by the arrangement described which, preliminarily taking into account the thickness t of the cutting tool 56, displaces the severing center O1 from the B-axis by an amount of deviation $\epsilon$.

Figure 21B:
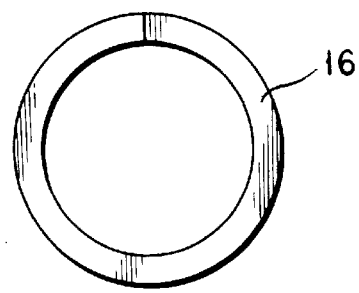

Thus, without off-setting the cutting tool 56 as mentioned, the workpiece 16 can here be severed with no such an opening as shown in FIG. 21B created where its severed surfaces are butted and abutting against each other and yet with an enhanced roundness.

Figure 22B:
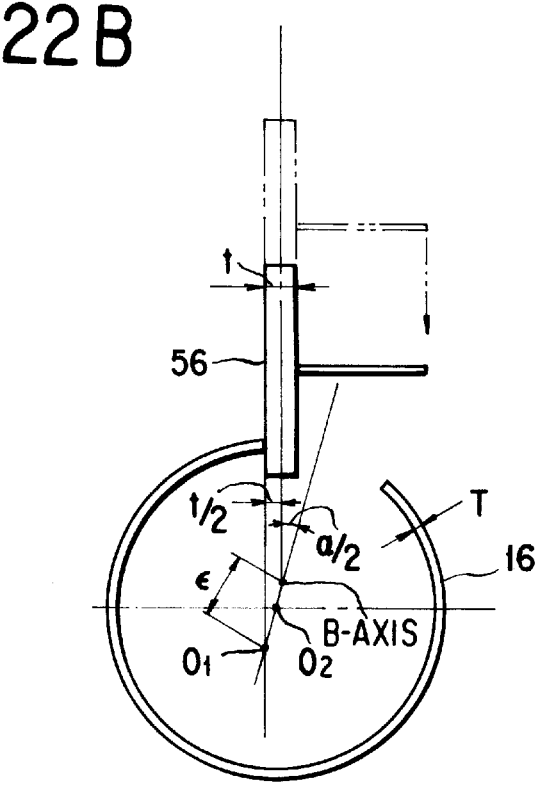

The next severing site is therefore severed in the manner as described before, i. e., by driving the X'-axis motor 53 to move the spindle head 50, advancing the rotating cutter tool 56 until it reaches the severing position below the workpiece 16 as shown in FIG. 22B, then driving the Z'-axis motor 45 to move the slide 43 upwards, permitting the workpiece 16 to be cut from its lower end side by the cutting tool 56.

And, after the workpiece 16 is cut to its upper end, the X'-axis motor 53 is driven to return the spindle head 50 to move backwards and the slide 43 is lowered by the Z'-axis motor to its original position.

To finish severing, the workpiece 16 is followed by an actuation of the clamp cylinder 65 that raises the clamp head 62a of the upper work support means 62 to permit the workpiece 16 to be released. After removing the workpiece 16 from between the upper and lower workpiece support means 62 and 63, a new workpiece 16 to be next severed is introduced and the operation is repeated. Thus, with the machining data preliminary input and stored in the NC unit 36, a machining operation from the interior and exterior machining of a workpiece 16 to its severing process by the severing machine 41 can be attained on a full automatic basis, without requiring any manual adjustment for severing positions as necessitated heretofore.

Also, having a workpiece carry-in means disposed at a workpiece entrance side of the interior and exterior working machine 1, and a workpiece carry-out means disposed at a workpiece exit side of the severing means 41 permits all steps of a machining operation for a workpiece 16 from its carry-in, its interior and exterior machining, its severing and to its carry-out to be performed fully automatically, thus with its productivity highly enhanced.

While it takes longer to shape both inside and outside a workpiece than to sever a workpiece, the present invention as implemented in the form described operates the severing machine 41 with a single cutting tool to sever the workpiece in two steps.

This arrangement is designed to make a workpiece 16 severed and another workpiece 16 both inside and outside shaped in a substantially equal period of time. Permitting the two separate machining operations to be performed simultaneously and yet in a substantially equal period of time with the severing machine 41 continued to operate while its counterpart is operating provides an improved machining line balance and results in an enhanced operating efficiency of the entire apparatus, and hence its productivity raised.

An explanation is next given in detail of a second form of implementation of the present invention.

Figure 23:
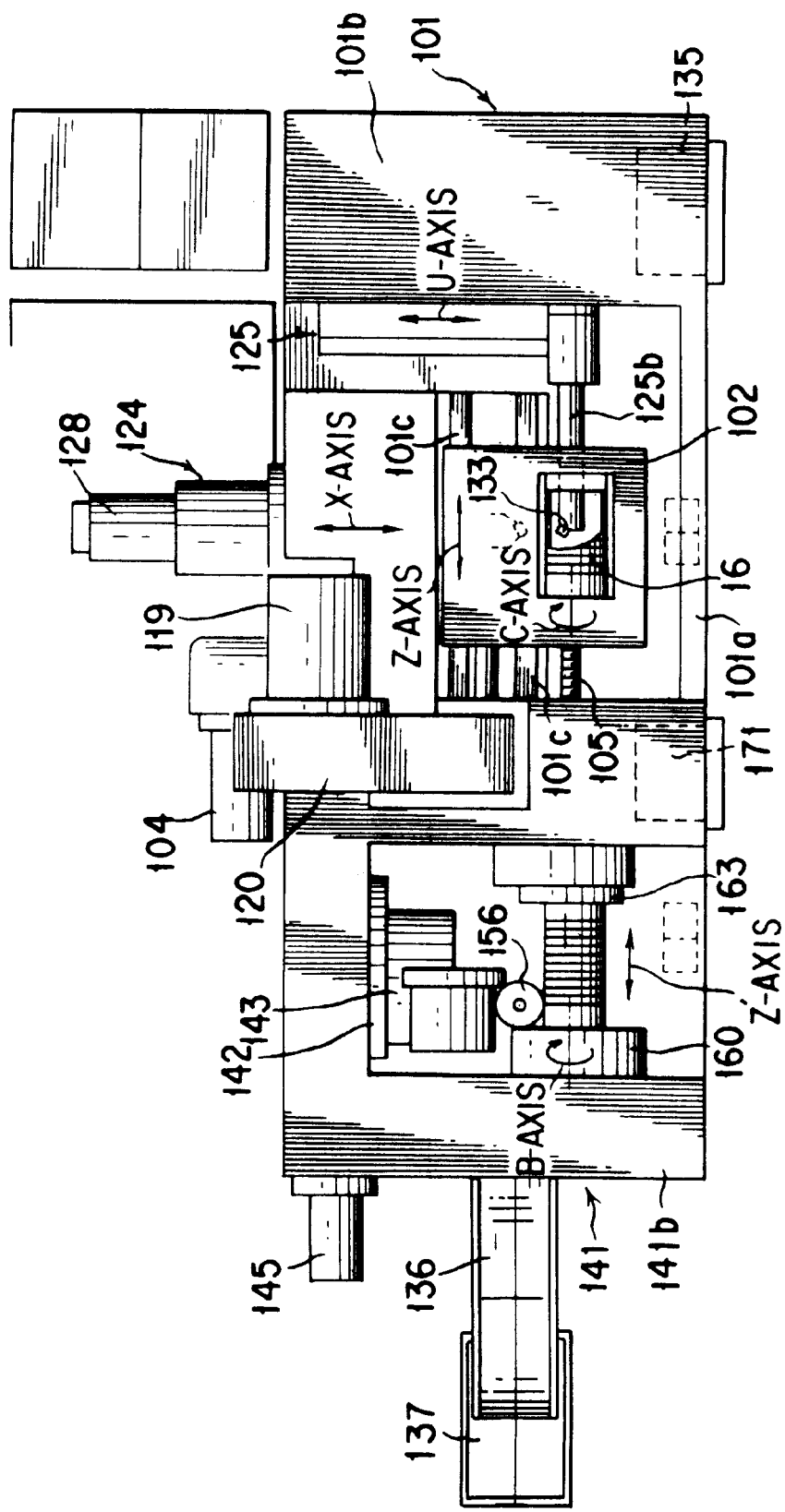
FIG. 23 is a top plan view of a combined machining apparatus to make piston rings that is implemented in a second form in accordance with the present invention.
Figure 24:
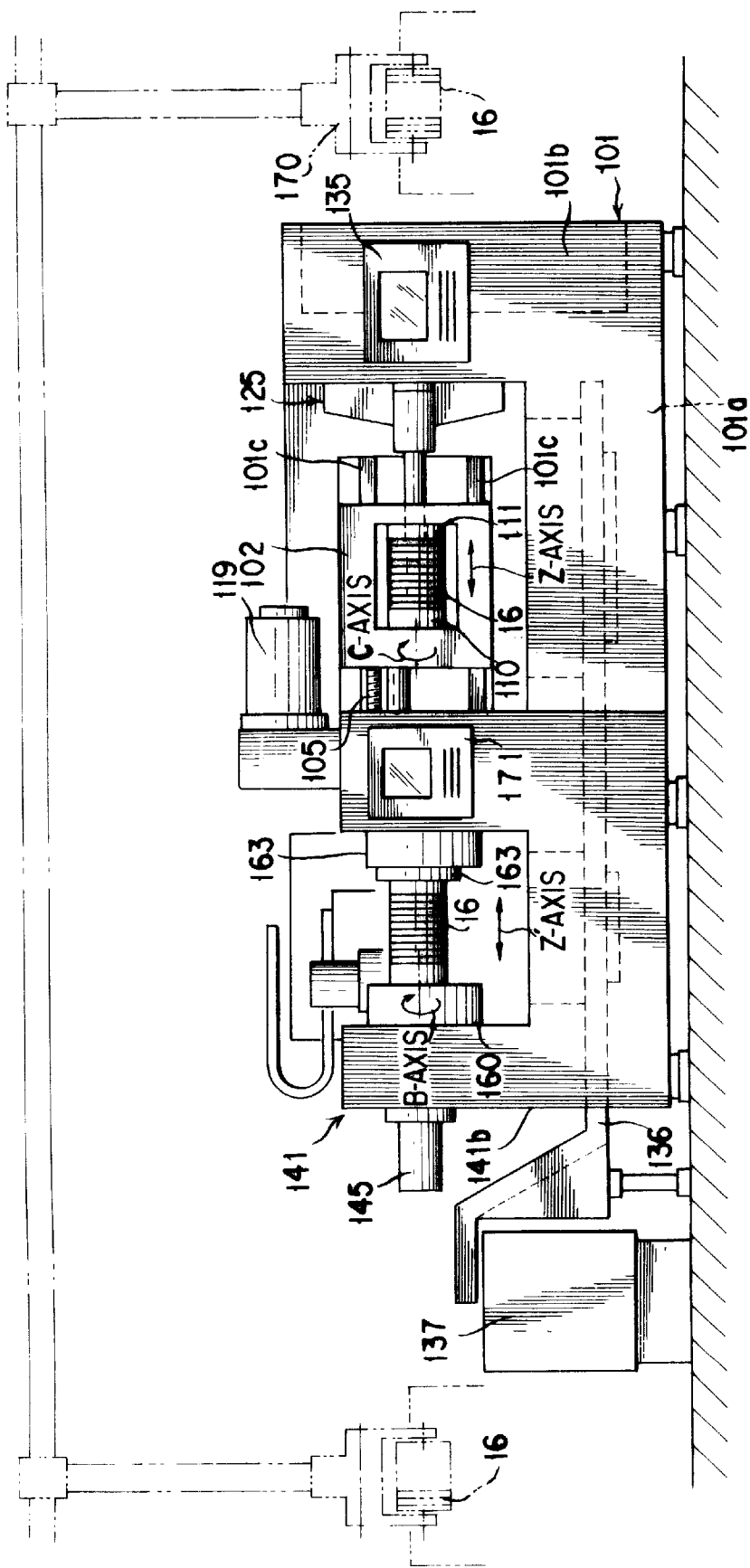
FIG. 24 is a front view of an interior and exterior working machine body that is included in the second form of implementation of the combined machining apparatus.
Figure 25:
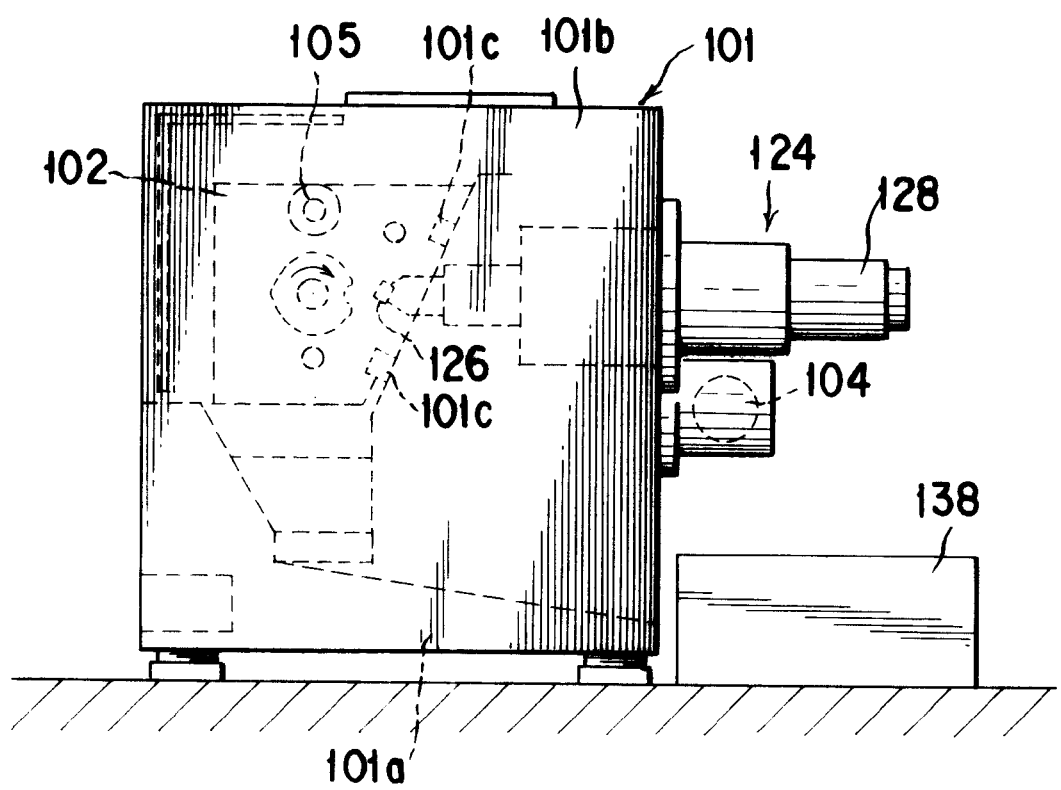
FIG. 25 is a side view of the interior and exterior working machine body in the second form of implementation of the apparatus.
Figure 26:
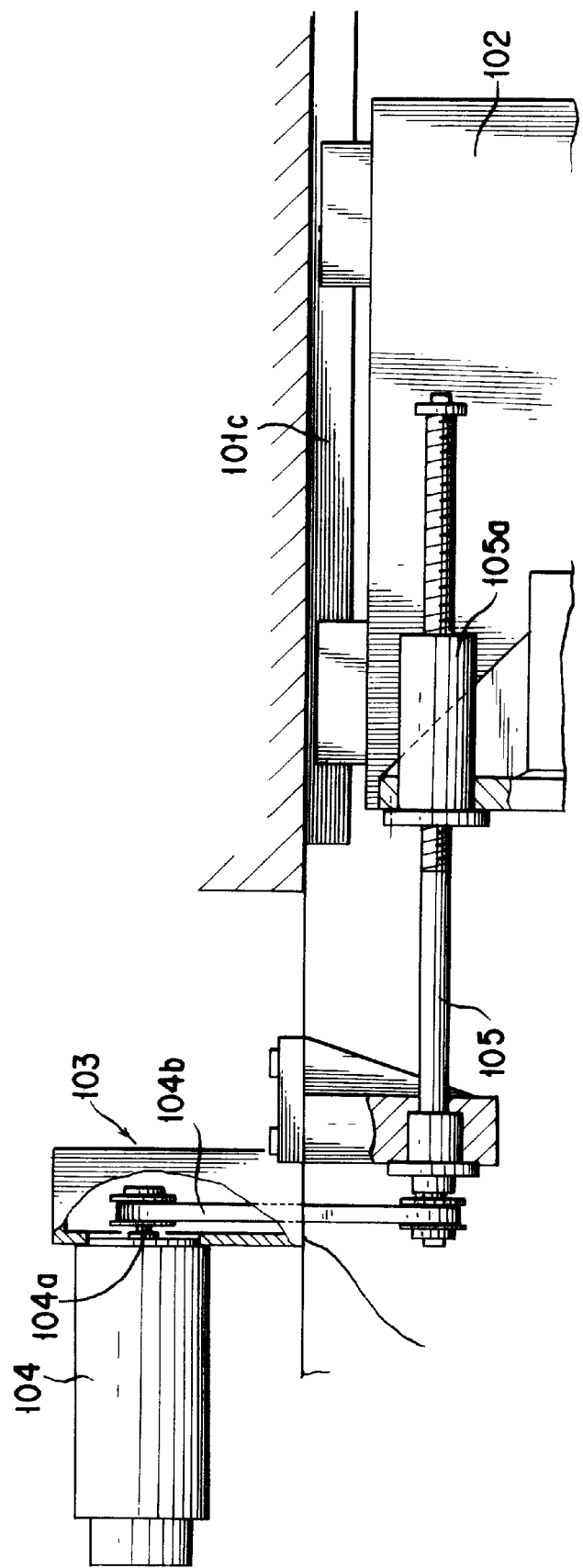
FIG. 26 is a cross sectional view of a Z-axis drive means that is included in the interior and exterior working machine body in the second form of implementation of the apparatus.

FIGS. 23, 24 and 25 are a top plan view, a front view and a side view of a transverse type combined machining apparatus according to the present invention that can perform both the interior and exterior machining of a piston ring workpiece and the severing of the so machined piston ring workpiece consecutively.

As shown, an interior and exterior working machine body 101 and the severing machine body 141 are mounted as coaxially positioned and horizontally spaced apart from each other on a common bed 101a.

The interior and exterior working machine body 101 has a column 101b mounted on the common bed 111a, and a Z-axis slide 102 disposed in front of the column 101b so as to be movable horizontally (in a direction of Z-axis) by means of a Z-axis drive means 103.

The Z-axis slide 102 is supported on a pair of guide rails 101c each comprising a ball type linear guide rail laid in front of the column 101b. The Z-axis slide 102 is adapted to be moved in the direction of Z-axis by a Z-axis motor 104 comprising a servo motor disposed rearwards of the column 101b.

Specifically, the Z-axis motor 104 has its drive shaft 104a has a pair of threaded shafts 105 each connected to it via a transmission means 104b such as timing belt and a gear or gear set. The threaded shaft 105 is in mesh with a nut member 105a fastened to the Z-axis slide 102 so that rotating the threaded shaft 105 normally and reversely by the Z-axis motor 104 may move the Z-axis slide 102 on the guide rails 101c horizontally.

Also, the Z-axis slide 102 has, at its left hand and right hand sides, a pair of workpiece support means 110 and 111, respectively.

Figure 27:
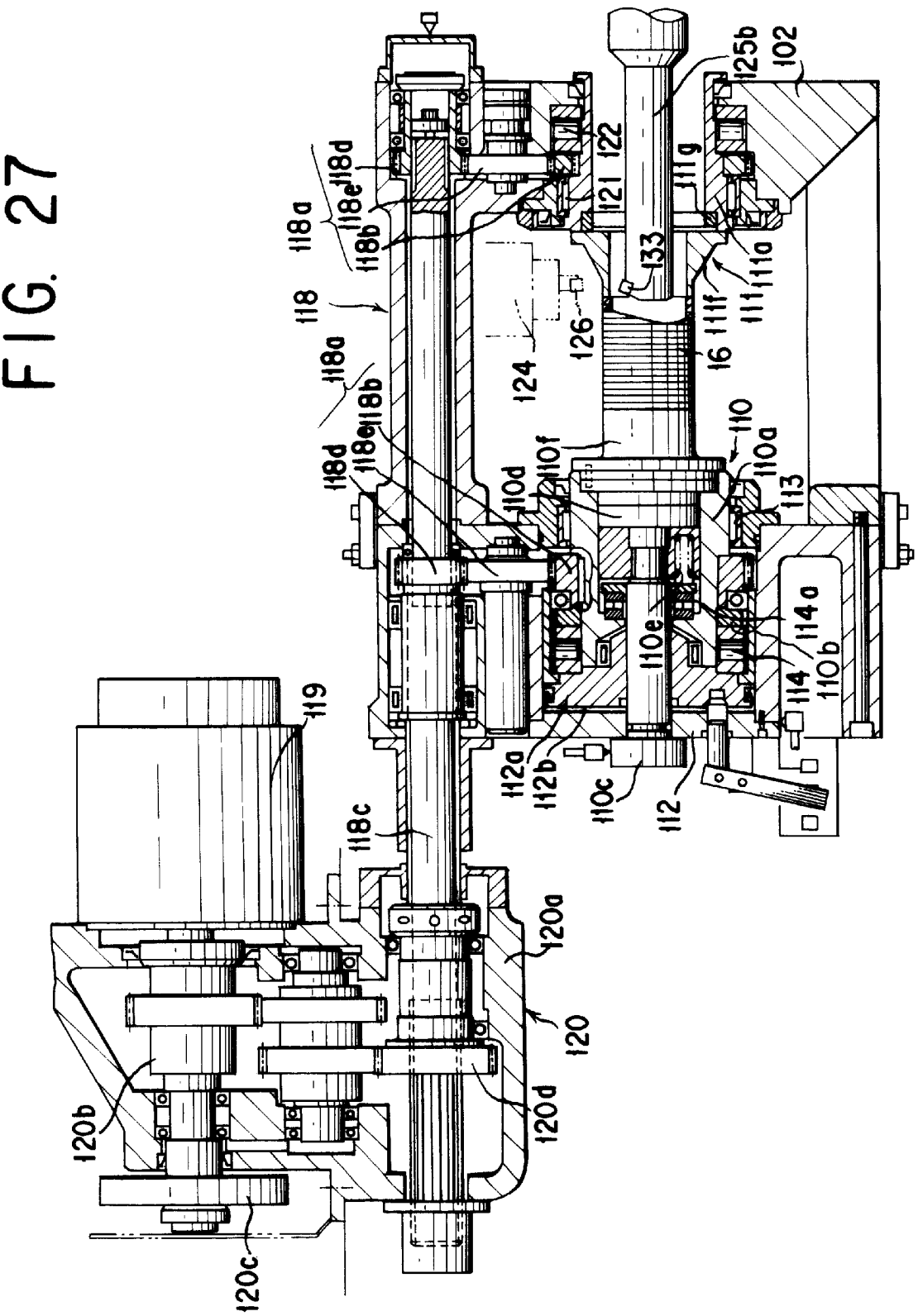
FIG. 27 is a cross sectional view of a C-axis drive means that is included in the interior and exterior working machine body in the second form of implementation of the apparatus.

The left hand side workpiece support means 110, as shown in FIG. 27, includes a spindle (left hand side spindle) 110a located rightwards of a hydraulic cylinder 112 arranged at a left hand side of the Z-axis slide 102 and also rightwards of a piston 112a received in the hydraulic cylinder 112.

The left hand side spindle 110a is in the form of a hollow cylinder and is supported via a plurality of bearings 113 by the hydraulic cylinder 112 so as to be not only movable in the direction of the Z-axis but also rotatable about the Z-axis. And, the end surface of of the piston 112a is held in contact via a thrust bearing 114 with the end surface of a ring 110b that is fitted on the left hand side spindle 110a so that supplying a pressure chamber 112b in the hydraulic cylinder 112 with pressure fluid may urge via the piston 112a the left hand side spindle 110a rightwards.

The hydraulic cylinder 112 has at a center region of it a fixed shaft 110c whose one end is fastened to the end surface of the hydraulic cylinder 112.

The fixed shaft 110c has the other end side which passes through the piston 112a, then reaching a center of the left hand side spindle 110a. A plurality of compression springs 110e are arranged on a spring seat 110d attached to that other end of the fixed shaft 110c to energize the left hand side spindle 110a leftwards via bearing 114a.

The left hand spindle 110a is provided at its end with a clamp head 110f that acts to clamp the workpiece 16 between it and a clamp head 111f provided in the right hand side workpiece support means 111. Keyed and attached around the left hand side spindle 110a is a follower gear 118b in a gear train 118a that is included in the C-axis drive means 118.

As shown in FIG. 27, the C-axis drive means 118 has a C-axis motor 119 that comprises a servo motor attached to a gear case 120a which is in turn attached to a left hand side end face of the column 101b. The C-axis motor 119 has its output shaft connected to the input shaft 120b of a reducer 120.

The input shaft 120b of the reducer 120 has a fly wheel 120c attached thereto in order to stabilize rotation of the workpiece 16 to prevent it from rotating unevenly. The reducer 120 has its output gear 120d that is in a spline engagement with a left hand side end portion of the drive shaft 118c, formed with a spline shaft, so that the drive shaft 118c may be rotated normally and reversely by the C-axis motor 119 via the reducer 120.

The drive shaft 118c is rotatably supported to lie horizontally and also parallel to the longitudinal axis of the workpiece 16 and has a mid and a right hand side end portion each of which is in a spline engagement with a drive gear 118d in the gear train 118a that is provided in each of the left hand side and right hand side workpiece support means 110 and 111.

Each of the drive gears 118d is set in mesh, via an intermediate gear 118e, with the follower gear 118b that is fitted onto each of the left hand side and right hand side spindles 110a and 111a so that the C-axis motor 119 may rotate both the left hand side and right hand side spindles 110a and 111a synchronously in a same direction via the drive shafts 118c and the respective gear trains 118a.

The right hand side spindle 111a is also a hollow cylinder as is the left hand side spindle 110a, and is rotatably supported on the Z-axis slide 102 side via a bearing 121. A thrust bearing 122 is interposed between the Z-axis slide 102 and the follower gear 118b keyed onto the right hand side spindle 111a.

The clamp head 111f included in the right hand side workpiece support means 111 is mounted to the right hand side spindle 111a to permit the workpiece 16 to be clamped between it and the clamp head 110f attached to the left hand side spindle 110a in the left hand side workpiece support means 110.

It should be noted at this point that when the left hand side and right hand side spindles 110a and 111a are synchronously rotated by the C-axis motor 119, a backlash in the gear trains 118a and a spline in the drive shaft 118 may cause the left hand side and right hand side spindles 110a and 111b to rotate unevenly, which results in a deviation in phase of rotation between them.

In order to prevent that, in starting to machine the workpiece 16, a plate 111g in the right hand side spindle 111a shown is adapted to be fixed in position by a suitable locking means (not shown) such as a lock-tight where a backlash in the upper and lower gear trains is removed.

On the other hand, the column 101b carries on it an interior machining means 125 for machining the inner surface of the workpiece 16, which has a U-axis slide 125a that carries on it an exterior machining means 124 for machining the outer surface of the workpiece 16 while the inner surface is being machined by the interior machining means 125.

Figure 28:
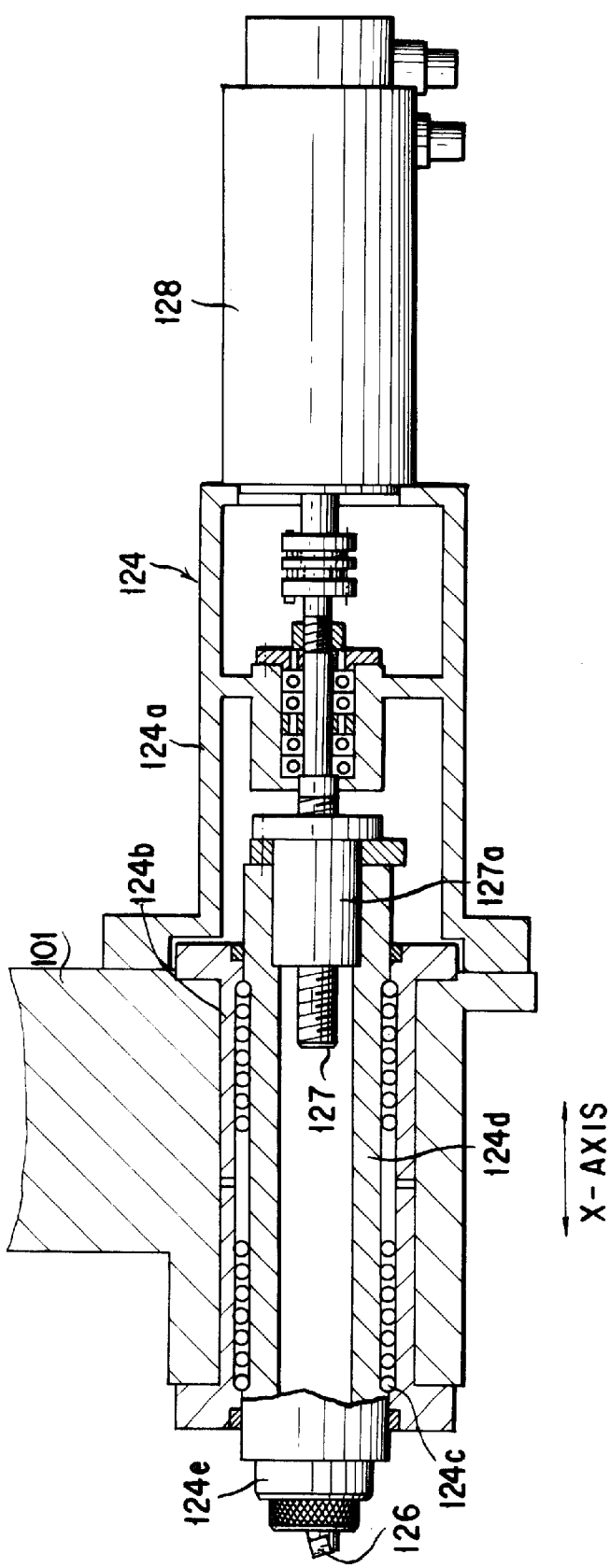
FIG. 28 is a cross sectional view of an exterior machining means that is included in the interior and exterior working machine body in the second form of implementation of the apparatus.

As shown in FIG. 28, the exterior machining unit 124 has a support member 124a fastened to a rear surface of the working machine body 101. The support member 124a has one end side at which a guide member 124b in the form of a hollow cylinder is fastened to the column 101b so as to extend horizontally parallel to the X-axis. In the guide member 124b, a tool support member 124d is supported via a ball spline 124c so it may be moved in a direction of the X-axis.

The tool support member 124d has at its end proximal to the workpiece 16 and removably mounted thereto via a tool mounting member 124e a cutting tool 126 for machining an outside of the workpiece 16. The tool support member 124d has at its opposite end a nut member 127a fastened thereto which is in mesh with one end portion of a threaded shaft 127 that comprises a ball screw which is screwed into it.

The threaded shaft 127 has it other end side coupled to the output shaft of an X-axis motor 128 that comprises a servo motor so that the X-axis motor 128 rotating the threaded shaft 127 in one and the other directions (normally and reversely) may move the tool support member 124d that carries the cutting tool 126 towards and away from the workpiece 16.

Figure 29:
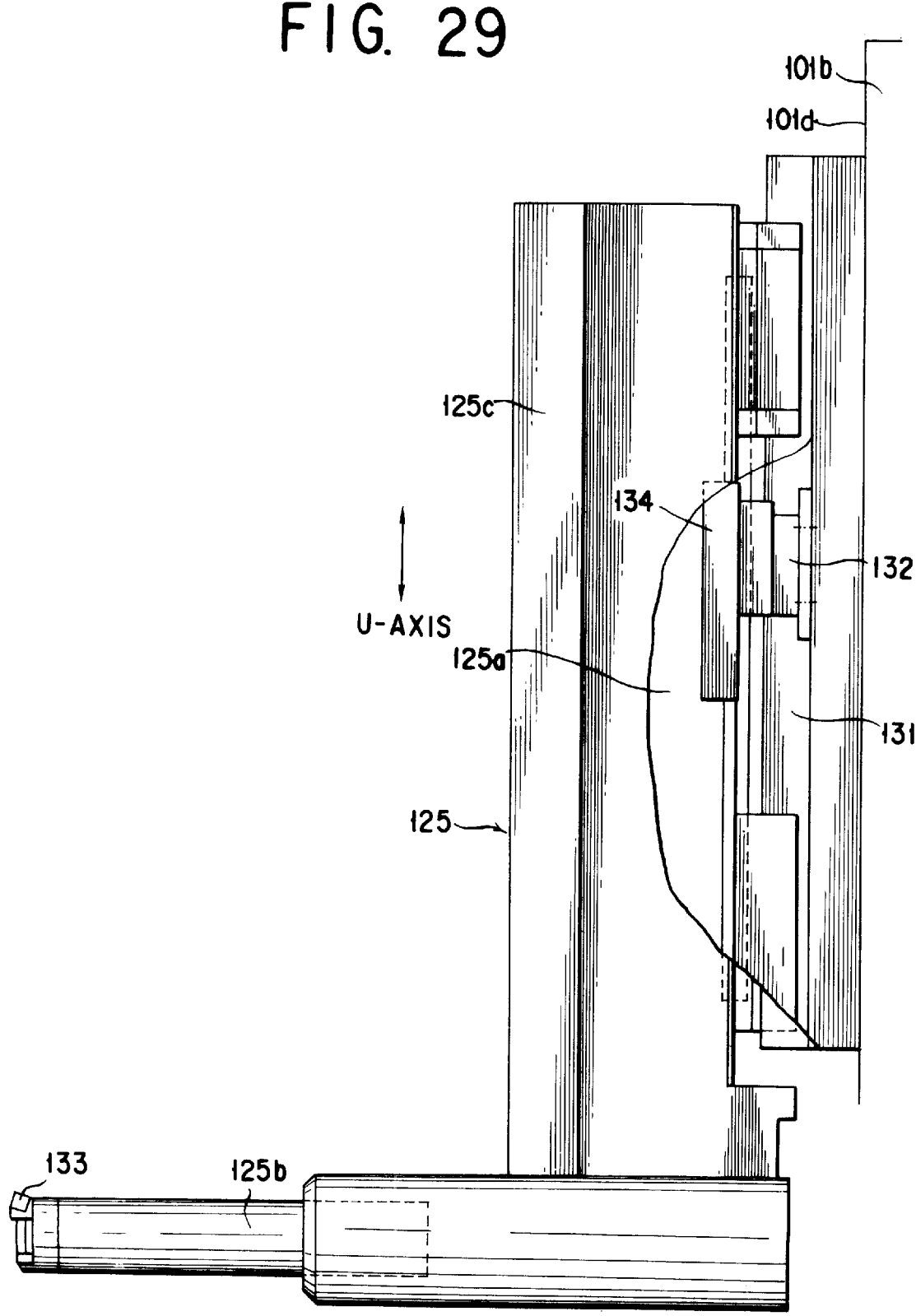
FIG. 29 is a top plan view, in part cut away, of an interior machining means that is included in the interior and exterior working machine body in the second form of implementation of the apparatus.

On the other hand, the interior machining unit 125 for shaping an inside of the workpiece 16 includes, as shown in FIG. 29, a U-axis slide 125a that is carried on a pair of guide rails 131 each comprising a roller type linear guide which is laid on a vertical surface 101c of the column 101b to extend in a direction of the U-axis parallel to the X-axis.

The left hand side of the U-axis slide 125a is sealed with a roof cover 125c to ease removal of chips from a cutting zone. To drive the U-axis slide 125a along the U-axis, a U-axis motor 132 comprising a linear servo motor is provided as mounted between the U-axis slide 125a and the vertical surface of the column 101b.

The U-axis slide 125a has its forward end reaching a point rightwards of the right hand side spindle 111a, at which is fastened thereto one end of a balling bar 125b as mounted substantially horizontally thereto.

The balling bar 125b has the other end portion that past the inside of the right hand side spindle 111a reaches the inside of the workpiece 16, and has its forward end at which a cutting tool 133 for machining an interior of the workpiece 16 is detachably mounted thereto.

As shown in FIG. 29, the apparatus is also provided with a slide position detector means 134 that may comprise a linear scale for detecting the position of the U-axis slide 125a moving along the U-axis. The slide position detector means 134 is constructed and arranged to furnish a signal into an NC unit 135 that is designed to control the Z-axis motor 104, the C-axis motor 119, the U-axis motor 132 and so forth.

In FIG. 23, the machining apparatus is shown also to include a chip conveyer 136 that is designed to carry out chips produced while the workpiece 16 is being machined and to cast them into a chip box 137 placed in the vicinity of the machining apparatus body 101. A coolant reservoir 138 is provided for the recovery of cutting fluid supplied to the cutting zone.

In addition to the interior and exterior working machine body 101 constructed as so far described, the apparatus includes a severing machine body 141 with a construction as described in detail below with reference to FIGS. 30 and 31.

The severing machine body 141, like the interior and exterior working machine body 101, has a column 141b mounted on the common bed 101a. In front of the column 141b, a pair of guide rails 142 each comprising a linear guide are laid to extend horizontally (in a direction of Z'-axis) and a Z'-axis slide 143 is slidably supported on the guide rails 142 so as to be movable in a direction of Z'-axis.

Between the guide rails 142 is provided a threaded shaft 144 comprising a ball screw that extends parallel to the guide rails 142. The threaded shaft 144 is in mesh with a nut member (not shown) fixed to the Z'-axis slide 143. The one end of the threaded shaft 144 is connected to a Z'-axis motor 145 comprising a servo motor so that rotating the threaded shaft 144 normally and reversely by the Z'-axis motor 145 may cause the Z'-axis slide 143 to move in the direction of Z'-axis.

Also, the upper surface of the slide 143 has a guide rail 149 comprising a linear guide laid thereon to extend in horizontal direction orthogonal to a direction of Z'-axis (in a direction of X'-axis), and a spindle head 150 is supported on the guide rail 149 so as to be movable in the direction of X'-axis.

Figure 31:
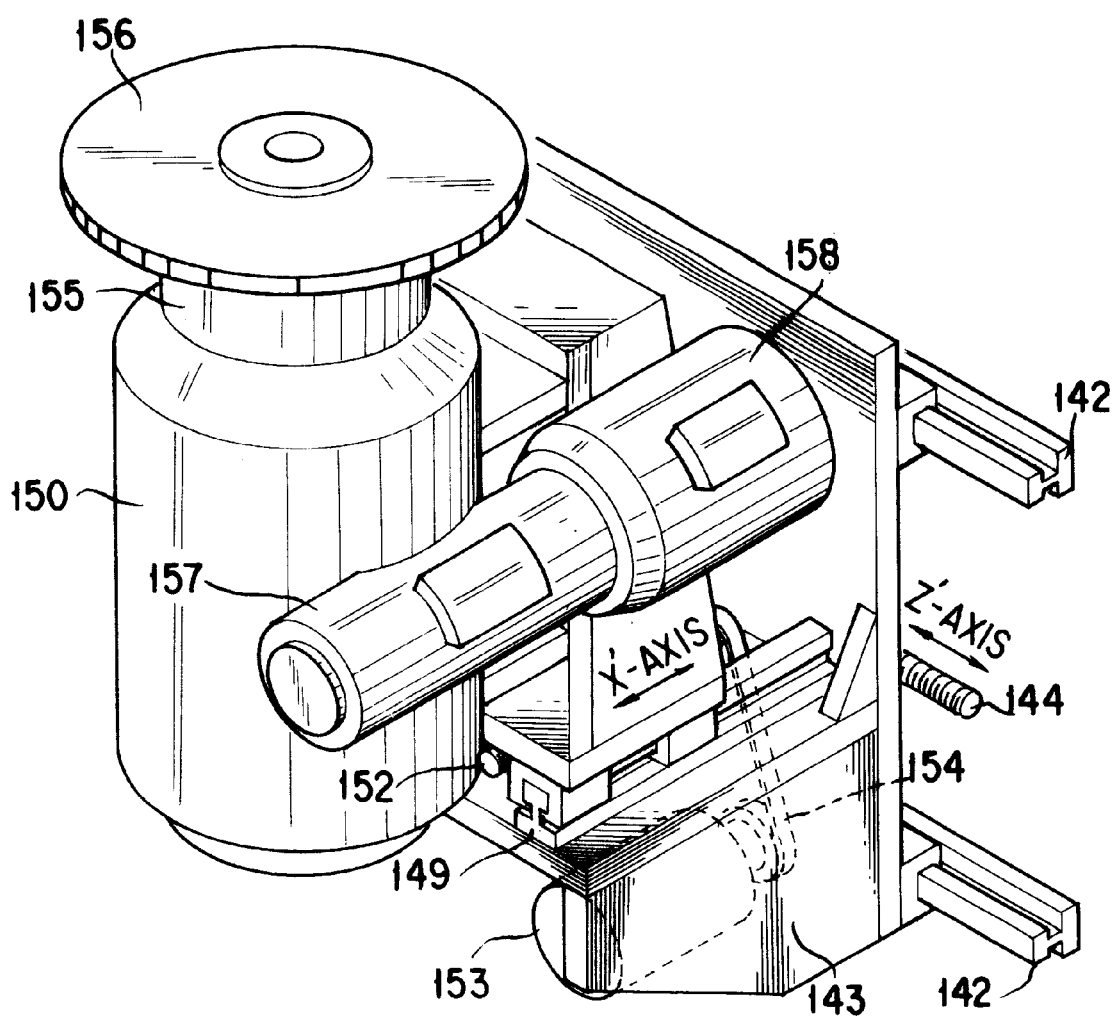
FIG. 31 is a perspective view showing a region of a spindle head that is included in the severing machine body in the second form of implementation of the apparatus.

Below the spindle head 150 as shown in FIG. 31 is arranged a threaded shaft 152 comprising a ball screw to extend parallel to the guide rail 149. The threaded shaft 152 is arranged in mesh with a nut member (not shown) fastened to a lower extension of the spindle head 150. One end of the threaded shaft 152 is coupled via an endless belt 154 to an X'-axis motor 153 comprising a servo motor disposed at the slide 143 side so that rotating the threaded shaft 152 normally and reversely by the X'-axis motor 153 may move the spindle head 150 in the direction of X'-axis.

As shown in FIG. 31, the spindle head 150 has a spindle 155 supported rotatably about an axis in a vertical direction orthogonal to the X'-axis.

The spindle 155 has one end side to which a cutting tool 156 comprising a metal saw is detachably mounted and the other end side connected via a worm type reducer 157 to a spindle motor 158 comprising a general purpose motor as controllable by an inverter to rotate the spindle 155 and thus the cutting tool 156.

Figure 30:
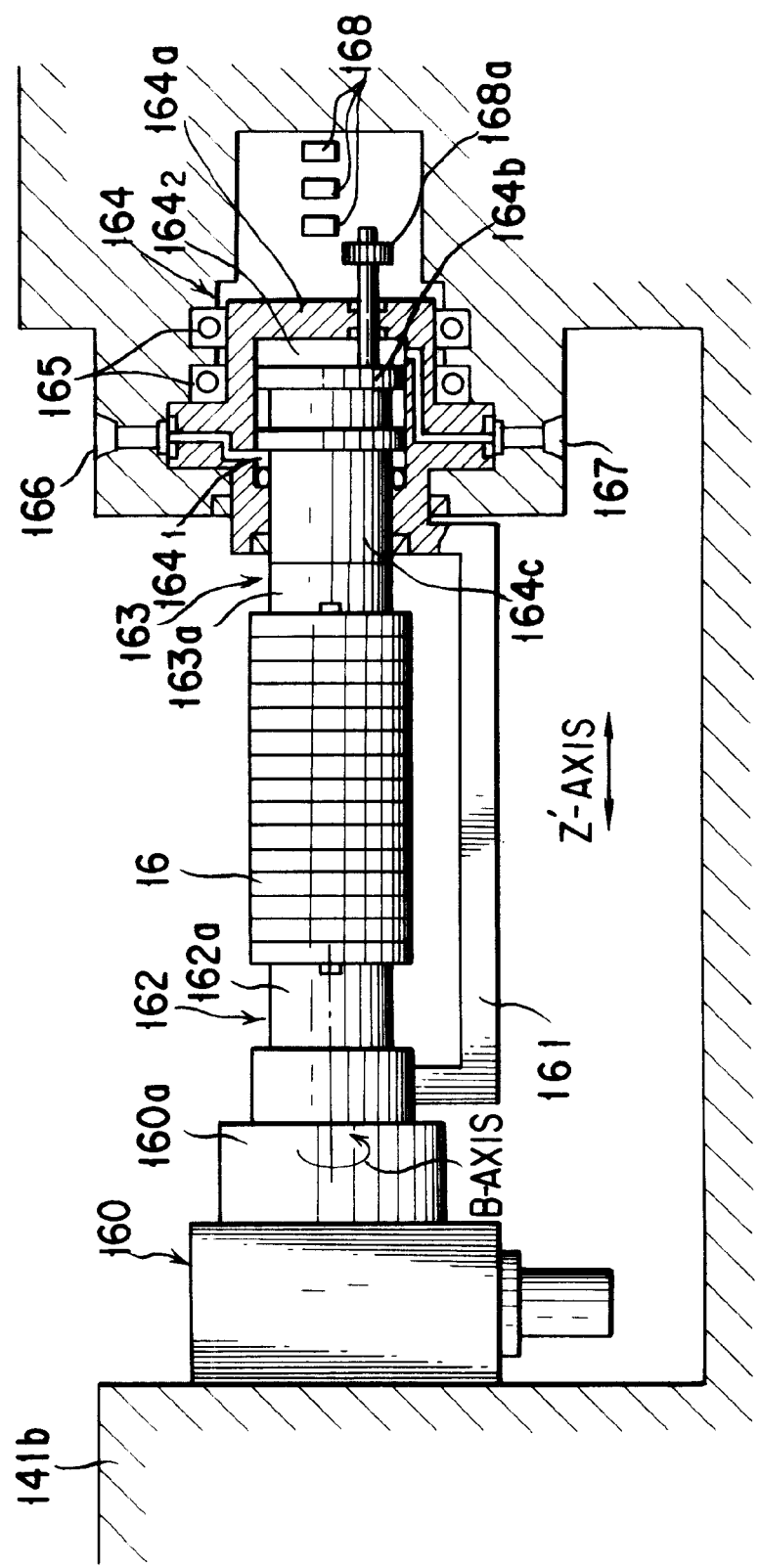
FIG. 30 is a front view, in part cut away, of a severing machine body that is included in the second form of implementation of the combined machining apparatus.

Also, as shown in FIG. 30, a B-axis indexing means 160 is mounted to one of the opposing surfaces of the column 141b mounted on the common bed 101a.

The B-axis indexing means 160 has an indexing table 160a adapted to be rotated about a B-axis for indexing. A support frame 161 configured in a C-letter form is mounted on the indexing table 160a.

The support frame 161 carries a left hand side workpiece support means 162 and a right hand side workpiece support means 163 which are horizontally spaced apart with their centers lying on the B-axis.

In a region where each of the left hand side and right hand side workpiece support means 162 and 163 are opposing to the other, there are disposed a clamp head 162a, 163a. The clamp heads 162a and 163a are adapted to clamp from the left and right hand sides the opposite ends of a workpiece 16 comprising a stack of non-circular rings brought and held together in its axial direction, while establishing a workpiece severing center O1 as deviated in position from the B-axis by a distance ε. The clamp head 163a of the right hand side workpiece support means 163 is fastened to the forward end of a piston rod 164c in a clamping cylinder assembly 164 that is arranged at the side of the other of the opposing surfaces of the column 141b.

The clamping cylinder assembly 164 has a cylinder portion 164a fastened to the right hand side end of the support frame 161. The cylinder portion 164a is supported via a bearing 165 so as to be rotatable about the B-axis. The piston rod 164c is constructed to extend from a piston 164b received in the cylinder portion 164a. The cylinder portion 164a defines with the piston rod 164c a left hand side fluid chamber 164, that communicates with an unclamping fluid port 166 and, with the piston 164b a right hand side fluid chamber 1642 that communicates with a clamping fluid port 167 so that admitting pressure fluid through the ports 166 and 167 into the left hand side and right hand side chambers 1641 and 1642 may allow the workpiece 16 to be unclamped and clamped, respectively.

Shown also in FIG. 30 is a clamping detector means 168 that may comprise a series of limit switches adapted to successively be contacted by a dog 168a moving jointly with the piston 164b, thereby sensing the clamping and unclamping of the workpiece 16.

The arrangement as shown in FIG. 24 further includes a workpiece transfer means 170 for carrying a workpiece 16 into the transverse type combined machining apparatus and carrying out thereof the workpiece 16 machined thereby. Also shown included is an NC unit 171 designed to control the severing machine body 141.

An explanation is now given of an operation of the transverse type combined machining apparatus constructed as so far described.

Workpieces 16 which this apparatus is available to work include a piston ring workpiece whose inner and outer surfaces are identical in configuration but are different in diameter as shown in FIG. 18. The apparatus has the ability to efficiently work such workpieces and yet those having relatively large machinable diameters.

Again, in order for both inside and outside of the workpiece 16 that is being rotated by the C-axis motor 119 to be simultaneously machined, the X-axis, U-axis and Z-axis motors 128, 132 and 104 must be operated synchronously with the C-axis motor 119 under NC, and to this end, a standard cycle control makes it time-consuming to process movement data and therefore is inadequate to adopt.

Accordingly, in this second form of implementation of the invention as well, there is adopted either a rapid cycle control in operating the NC unit 135 or a DNC mode for a machining purpose as described.

When a rapid cycle control mode is adopted in operating the NC unit 135, data converted to a movement to be effected per unit processing time for each axis, a number of its cycles of repetition and so forth are registered in the data area and the header prepared for this control mode in the NC unit 135 to permit the latter to be operated in this mode under a main program for machining.

In initiating a machining operation, a plurality of piston ring workpieces are laminated or stacked in phase to form a hollow cylindrical workpiece 16. The workpiece 16 is then clamped with a pair of hand carrier jigs not shown from the left and right sides and, as it is held so, is carried into the interior and exterior machining apparatus body 101 so as to be set between the clamp heads 110f and 111f provided respectively on the left hand side and right hand side spindles 110a and 111a.

With the workpiece 16 so set, the fluid pressure chamber 112b in the hydraulic cylinder 112 is supplied with pressure fluid to move both the piston 112a and the left hand side spindle 110a rightwards and thereby to firmly clamp, between the clamp head 110f on the left hand side spindle 110a and the clamp head 111f on the right hand side spindle 111a, the workpiece 16 with its longitudinal axis held coincident with the common axis of the left hand side and right hand side spindles 110a and 111a.

The workpiece 16 is phase-indexed in that state. Then, the C-axis motor 119 is driven to cause the C-axis drive means 118 to rotate the left hand side and right hand side spindles 110a and 111a synchronously, thereby driving the workpiece 16 into rotation. The U-axis motor 132 is driven to move the U-axis slide 125a along the U-axis and to advance the cutting tool 133 in the interior machining unit 125 to a position where the workpiece 16 is to commence to be machined on its inner surface from one of its end sides.

The cutting tool 126 in the exterior machining unit 124 has then been retracted to a stand-by position where it does not interfere with the right hand side workpiece support means 111. It should thus be immediately before the cutting tool 133 in the interior machining unit 125 becomes ready to start machining the inner surface of the workpiece 16 that the X-axis motor 128 is driven into rotation to advance the tool support means 124d towards the workpiece 16 and to advance the cutting tool 126 mounted on the tool mounting member 124e to a position where the workpiece 16 is to commence to be machined on its outer surface from one of its end sides. The cutting tool 133 in the interior machining unit 125 and the cutting tool 126 in the exterior machining unit 124 are then operated to start and continue to machine both the inner and outer surfaces of the workpiece 16 simultaneously.

Here, in order to impart to the hollow cylindrical workpiece 16 outer and inner sculptured surfaces or contours given that vary in curvature or geometry, the X-axis and the U-axis motors 128 and 132 are operated independently of each other and in synchronism with the C-axis workpiece rotation under NC to so machine the workpiece 16 simultaneously both outside and inside. And, as machining proceeds, the Z-axis motor 104 is controllably driven to so move the Z-axis slide 102 in the direction of Z-axis (leftwards and rightwards) to permit the workpiece 16 to be machined both inside and outside over its given entire length. In the course of machining, it should be noted that those chips produced and emitted from the inside of the workpiece 16 are allowed to fall on the chip conveyer 136 which carries out and cast them into the chip box 137. Cutting fluid supplied into the cutting zone is removed and recovered into a coolant reservoir 138.

After the workpiece 16 has been machined, the X-axis motor 128 is driven to move the tool support member 124d back to its stand-by position and the U-axis motor 132 is then driven to move the U-axis slide 125a back to its original position. And, the Z-axis motor 104 is driven to move the Z-axis slide 102 back to its original position. Thereafter, discharging a pressure fluid out of the pressure chamber 112b in the hydraulic cylinder 112, permitting the left hand side spindle 110a to move leftwards under the action of the compression spring 110e and unclamp the workpiece 16.

After the workpiece 16 is so unclamped, the hand carrier jigs are used to clamp the workpiece 16 from the upper and lower sides. Then, operating a workpiece transfer means 170, the workpiece 16 so held clamped is carried from the interior and exterior working machine body 101 and is conveyed to a severing machine body 141 mounted adjacent thereto on the common bed 101a, where the workpiece 16 is severed.

It should be noted that the severing machine body 141 operates in the same operating principle as for the severing machine body 41 whose operation has previously been described in connection with the first form implemented of the present invention. Hence the detailed description of its operation is thought superfluous and omitted.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the presents invention. Accordingly, it should be understood that the invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. A combined apparatus for making piston rings from a workpiece constituted of vertically stacked piston ring workpieces brought and held together, comprising:

an interior and exterior working machine operable under synchronous control by an NC unit for machining both inside and outside of the stacked workpiece;

a severing machine for severing the stacked workpiece in a direction of a workpiece axis extending substantially vertically; and a common bed, wherein said interior and exterior working machine as a first machine body and said severing machine as a second machine body are mounted adjacent to each other on said common bed, and wherein said interior and exterior working machine comprises:

an upper and a lower workpiece support means for jointly clamping the stacked workpiece oriented substantially vertically, from opposite upper and lower sides of the stacked workpiece to support the stacked workpiece rotatably about said axis;

a C-axis drive means for driving both said upper and lower workpiece support means synchronously to positively drive both sides of said stacked workjpiece to rotate said stacked workpiece about said axis;

an exterior machining means having a first cutting tool arranged to be movable in a direction of an X-axis orthogonal to said workpiece axis for shaping an outer surface of said stacked workpiece;

an interior machining means having a second cutting tool arranged to be movable in a direction of a U-axis parallel to said X-axis and adapted to be inserted into the inside of said stacked workpiece from an end side of the stacked workpiece for shaping an inner surface of said stacked workpiece; and a Z-axis drive means for acting on both said upper and lower workpiece support means to move said stacked workpiece in a direction of said workpiece axis.

2. A combined apparatus for making piston rings from a workpiece constituted of horizontally stacked piston ring workpieces brought and held together, comprising:

an interior and exterior working machine operable under synchronous control by an NC unit for machining both inside and outside of the stacked workpiece;

a severing machine for severing the stacked workpiece in a direction of a workpiece axis extending substantially horizontally; and a common bed, wherein said interior and exterior working machine as a first machine body and said severing machine as a second machine body are mounted adjacent to each other on said common bed, and wherein said interior and exterior working machine comprises:

a left and a right hand workpiece support means for jointly clamping the stacked workpiece oriented substantially horizontally, from opposite left hand and right hand sides of the stacked workpiece to support the stacked workpiece rotatably about said axis;

a C-axis drive means for driving both said left and right hand workpiece support means synchronously to positively drive both sides of said stacked workpiece to rotate said stacked workpiece about said axis;

an exterior machining means having a first cutting tool arranged to be movable in a direction of an X-axis orthogonal to said workpiece axis for shaping an outer surface of said stacked workpiece; and an interior machining means having a second cutting tool arranged to be movable in a direction of a U-axis parallel to said X-axis and adapted to be inserted into the inside of said stacked workpiece from an end side of the stacked workpiece for shaping an inner surface of said stacked workpiece; and a Z-axis drive means for acting on both said left and right hand workpiece support means to move said stacked workpiece in a direction of said workpiece axis.

3. A combined machining apparatus for making piston rings as set forth in claim 1 or claim 2 in which said severing machine is adapted to sever the stacked workpiece a plurality of times by means of a single cutting tool.

4. A combined machining apparatus for making piston rings as set forth in claim 1 or claim 2 in which there is mounted between said first and second machine bodies a workpiece transfer means for transferring the stacked workpiece that has its inside and outside machined to said severing machine.

5. A combined machining apparatus for making piston rings as set forth in claim 1 in which said severing machine comprises:

an upper and a lower workpiece support means for clamping the stacked workpiece from opposite upper and lower sides of the stacked workpiece so that a severing center of the stacked workpiece is deviated in position from a B-axis parallel to the axis of the stacked workpiece;

a B-axis indexing means for rotating said stacked workpiece about said B-axis, and thereby indexing a severing angle position of the stacked workpiece;

a slide arranged to be movable in a direction of a Z'-axis parallel to said B-axis and adapted to be lifted and lowered in the Z'-axis direction by a Z'-axis motor;

a spindle head mounted on said slide and adapted to be moved towards and away from said stacked workpiece by an X'-axis motor; and a cutting tool mounted to said spindle head and adapted to be rotated by a spindle motor for severing said stacked workpiece.

6. A combined machining apparatus for making piston rings as set forth in claim 1, further comprising a workpiece carry-in means disposed at a workpiece entrance side of said interior and exterior working machine; and a workpiece carryout means disposed at a workpiece exit side of said severing machine.

7. A combined machining apparatus for making piston rings as set forth in claim 2 in which said severing machine comprises:

a left and a right workpiece support means for clamping the stacked workpiece from opposite left and right hand sides of the stacked workpiece so that a severing center of the stacked workpiece is deviated in position from a B-axis parallel to the axis of the stacked workpiece;

a B-axis indexing means for rotating said stacked workpiece about said B-axis, and thereby indexing a severing angle position of the stacked workpiece;

a slide arranged to be movable in a direction of a Z'-axis parallel to said B-axis and adapted to be lifted and lowered in the Z'-axis direction by a Z'-axis motor;

a spindle head mounted on said slide and adapted to be moved towards and away from said stacked workpiece by an X'-axis motor; and a cutting tool mounted to said spindle head and adapted to be rotated by a spindle motor for severing said stacked workpiece.

8. A combined machining apparatus for making piston rings as set forth in claim 2, further comprising a workpiece transfer means disposed upwards of both said interior and exterior working machine and said severing machine for conveying a stacked workpiece into said interior-exterior working machine, transferring the stacked workpiece machined over its inside and outside in said interior-exterior working machine to convey the stacked workpiece to said severing machine and conveying the stacked workpiece severed in said severing machine to carry the stacked workpiece out of said apparatus.

\* \* \* \* \*